(12) United States Patent
Xue et al.

(10) Patent No.: US 12,315,936 B2
(45) Date of Patent: *May 27, 2025

(54) ELECTRODE PLATE, ELECTROCHEMICAL APPARATUS, AND APPARATUS

(71) Applicant: CONTEMPORARY AMPEREX TECHNOLOGY (HONG KONG) LIMITED, Hong Kong (CN)

(72) Inventors: Qingrui Xue, Ningde (CN); Jing Li, Ningde (CN); Wei Li, Ningde (CN); Zige Zhang, Ningde (CN); Yang Zhang, Ningde (CN); Xianwei Yang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 438 days.

This patent is subject to a terminal disclaimer.

(21) Appl. No.: 17/501,893

(22) Filed: Oct. 14, 2021

(65) Prior Publication Data

US 2022/0037672 A1    Feb. 3, 2022

Related U.S. Application Data

(63) Continuation of application No. PCT/CN2019/129352, filed on Dec. 27, 2019.

(30) Foreign Application Priority Data

Apr. 15, 2019    (CN) .................... 201910299179.8

(51) Int. Cl.
*H01M 4/66*    (2006.01)
(52) U.S. Cl.
CPC .......... *H01M 4/668* (2013.01); *H01M 4/662* (2013.01); *H01M 4/667* (2013.01)

(58) Field of Classification Search
CPC ........ H01M 4/66; H01M 4/662; H01M 4/668; H01M 4/667
See application file for complete search history.

(56) References Cited

U.S. PATENT DOCUMENTS

| 4,492,021 A | 1/1985 | Wright |
| 5,478,676 A | 12/1995 | Turi et al. |

(Continued)

FOREIGN PATENT DOCUMENTS

| CN | 1579028 A | 2/2005 |
| CN | 1669163 A | 9/2005 |

(Continued)

OTHER PUBLICATIONS

Contemporary Amperex Technology Co., Limited, Extended European Search Report, EP19925114.1, Mar. 11, 2022, 4 pages.

(Continued)

*Primary Examiner* — Karie O'Neill Apicella
(74) *Attorney, Agent, or Firm* — K&L Gates LLP

(57) ABSTRACT

This application relates to an electrode plate, including a current collector and an electrode active material layer disposed on at least one surface of the current collector. The current collector includes a support layer and a conductive layer disposed on at least one surface of the support layer, where single-side thickness D2 of the conductive layer satisfies: 30 nm≤D2≤3 μm, the support layer includes a polymer material or a polymer composite material, and thickness D1 of the support layer satisfies: 1 μm≤D1≤20 μm. The electrode active material layer includes an electrode active material, a binder, and a conductive agent, where total thickness $D_{total}$ of the electrode active material layer satisfies: 200≥$D_{total}$/D1≥1, and based on total weight of the electrode active material layer, the binder content in the electrode active material layer is not less than 1 wt %.

20 Claims, 8 Drawing Sheets

(56) References Cited

U.S. PATENT DOCUMENTS

| | | |
|---|---|---|
| 5,645,959 A | 7/1997 | Rowlette |
| 6,022,642 A | 2/2000 | Tsukamoto et al. |
| 6,420,066 B1 | 7/2002 | Frustaci |
| 8,323,831 B2 | 12/2012 | Wilkins |
| 8,691,445 B2 | 4/2014 | Park |
| 8,785,053 B2 | 7/2014 | Wang |
| 9,786,904 B2 | 10/2017 | Park |
| 11,769,883 B2 | 9/2023 | Liang et al. |
| 2002/0160265 A1 | 10/2002 | Hashimoto |
| 2004/0126654 A1* | 7/2004 | Sudano ............ H01M 10/0431 |
| | | 429/234 |
| 2004/0126663 A1 | 7/2004 | Sudano |
| 2004/0258997 A1 | 12/2004 | Utsugi |
| 2005/0221190 A1 | 10/2005 | Sudano |
| 2006/0019168 A1 | 1/2006 | Li |
| 2006/0105243 A1 | 5/2006 | Okamura |
| 2006/0127773 A1 | 6/2006 | Kawakami |
| 2006/0206186 A1* | 9/2006 | Mori ................ A61N 1/0492 |
| | | 607/153 |
| 2006/0263691 A1 | 11/2006 | Park |
| 2007/0224502 A1 | 9/2007 | Affinito |
| 2009/0305135 A1 | 12/2009 | Shi |
| 2010/0075223 A1 | 3/2010 | Hwang |
| 2010/0075225 A1 | 3/2010 | Wilkins |
| 2010/0129699 A1 | 5/2010 | Mikhaylik |
| 2010/0291442 A1 | 11/2010 | Wang |
| 2011/0200884 A1 | 8/2011 | Uchida |
| 2012/0164528 A1 | 6/2012 | Xu et al. |
| 2012/0208082 A1 | 8/2012 | Honda |
| 2012/0237824 A1 | 9/2012 | Koh |
| 2013/0045413 A1 | 2/2013 | Wang |
| 2013/0171523 A1 | 7/2013 | Chen |
| 2014/0072873 A1 | 3/2014 | Wang |
| 2014/0154580 A1 | 6/2014 | Park |
| 2014/0162138 A1 | 6/2014 | Fujiki |
| 2014/0291442 A1 | 10/2014 | Laks et al. |
| 2014/0370349 A1 | 12/2014 | Kwon |
| 2014/0370350 A1 | 12/2014 | Kwon |
| 2015/0221452 A1 | 8/2015 | Iida |
| 2015/0280241 A1 | 10/2015 | Hara |
| 2015/0303485 A1 | 10/2015 | Kim |
| 2016/0181620 A1 | 6/2016 | Kim |
| 2016/0211524 A1 | 7/2016 | Hao |
| 2016/0294015 A1* | 10/2016 | Tanaka ................ H01M 50/586 |
| 2016/0351892 A1 | 12/2016 | Sugimori |
| 2017/0033399 A1 | 2/2017 | Fujisawa |
| 2017/0324077 A1 | 11/2017 | Liu |
| 2017/0338493 A1 | 11/2017 | Shin |
| 2017/0353585 A1 | 12/2017 | Krishnan |
| 2018/0006291 A1 | 1/2018 | Kim |
| 2018/0006307 A1 | 1/2018 | Song et al. |
| 2018/0069229 A1 | 3/2018 | Ko |
| 2018/0145317 A1 | 5/2018 | Momma et al. |
| 2018/0198132 A1 | 7/2018 | Liang |
| 2018/0205115 A1 | 7/2018 | Haba |
| 2018/0219212 A1 | 8/2018 | Seol |
| 2018/0287158 A1 | 10/2018 | Ma |
| 2018/0301709 A1 | 10/2018 | Qiu |
| 2019/0006658 A1 | 1/2019 | Chae |
| 2019/0173090 A1 | 6/2019 | Liang |
| 2019/0173092 A1 | 6/2019 | Liang |
| 2019/0245210 A1 | 8/2019 | Matsushita |
| 2019/0393511 A1 | 12/2019 | Zhou |
| 2020/0083527 A1 | 3/2020 | Nakamura |
| 2020/0083542 A1 | 3/2020 | Yushin |
| 2020/0086354 A1 | 3/2020 | Becher |
| 2020/0295377 A1 | 9/2020 | Liang |
| 2020/0388875 A1 | 12/2020 | Kano |
| 2020/0403247 A1 | 12/2020 | Turi |
| 2021/0066691 A1 | 3/2021 | Asai |
| 2021/0119196 A1 | 4/2021 | Li |
| 2021/0119218 A1 | 4/2021 | Li |
| 2021/0119221 A1 | 4/2021 | Li |
| 2021/0151769 A1 | 5/2021 | Li |
| 2021/0151772 A1 | 5/2021 | Li |
| 2021/0167397 A1 | 6/2021 | Kim et al. |
| 2021/0210763 A1 | 7/2021 | Li |
| 2021/0288329 A1 | 9/2021 | Liang |
| 2021/0296654 A1 | 9/2021 | Liang |
| 2021/0320322 A1 | 10/2021 | Yasuda |
| 2022/0037663 A1 | 2/2022 | Tamaki |
| 2022/0037667 A1 | 2/2022 | Li |
| 2022/0037669 A1 | 2/2022 | Li |
| 2022/0037670 A1 | 2/2022 | Li |
| 2022/0037672 A1 | 2/2022 | Xue |
| 2022/0093932 A1 | 3/2022 | Li |

FOREIGN PATENT DOCUMENTS

| | | | | |
|---|---|---|---|---|
| CN | 1855588 | A | 11/2006 | |
| CN | 101071860 | A | 11/2007 | |
| CN | 101174685 | A | 5/2008 | |
| CN | 101207197 | A | 6/2008 | |
| CN | 101627494 | A | 1/2010 | |
| CN | 101884125 | A | 11/2010 | |
| CN | 2011165388 | A | 8/2011 | |
| CN | 102195032 | A | 9/2011 | |
| CN | 102306800 | A | 1/2012 | |
| CN | 102332558 | A | 1/2012 | |
| CN | 102569816 | A | 7/2012 | |
| CN | 102847859 | A | 1/2013 | |
| CN | 103131267 | A | 6/2013 | |
| CN | 103165863 | A | 6/2013 | |
| CN | 103268942 | A | 8/2013 | |
| CN | 103326029 | A | 9/2013 | |
| CN | 203218375 | U | 9/2013 | |
| CN | 103545530 | A | 1/2014 | |
| CN | 103779569 | A * | 5/2014 | ............ H01M 4/13 |
| CN | 103956499 | A | 7/2014 | |
| CN | 104303344 | A | 1/2015 | |
| CN | 104321907 | A | 1/2015 | |
| CN | 204088469 | U | 1/2015 | |
| CN | 103094619 | B | 2/2015 | |
| CN | 104508896 | A | 4/2015 | |
| CN | 104659368 | A | 5/2015 | |
| CN | 104716328 | A | 6/2015 | |
| CN | 105027347 | A | 11/2015 | |
| CN | 105406083 | A | 3/2016 | |
| CN | 105489845 | A | 4/2016 | |
| CN | 105493323 | A | 4/2016 | |
| CN | 105514349 | A | 4/2016 | |
| CN | 105895193 | A | 8/2016 | |
| CN | 105958118 | A | 9/2016 | |
| CN | 106463698 | A | 2/2017 | |
| CN | 106654285 | A | 5/2017 | |
| CN | 106684319 | A | 5/2017 | |
| CN | 106848324 | A | 6/2017 | |
| CN | 106898729 | A | 6/2017 | |
| CN | 106910897 | A | 6/2017 | |
| CN | 106935901 | A | 7/2017 | |
| CN | 106941149 | A | 7/2017 | |
| CN | 106981665 | A | 7/2017 | |
| CN | 107123812 | A | 9/2017 | |
| CN | 107154499 | A | 9/2017 | |
| CN | 107221676 | A | 9/2017 | |
| CN | 107240721 | A | 10/2017 | |
| CN | 107302094 | A | 10/2017 | |
| CN | 107431186 | A | 12/2017 | |
| CN | 107437622 | A | 12/2017 | |
| CN | 107565137 | A | 1/2018 | |
| CN | 107732146 | A | 2/2018 | |
| CN | 107768677 | A | 3/2018 | |
| CN | 107851836 | A | 3/2018 | |
| CN | 207097950 | U | 3/2018 | |
| CN | 104428928 | B | 4/2018 | |
| CN | 107925056 | A | 4/2018 | |
| CN | 108110220 | A | 6/2018 | |
| CN | 108155363 | A | 6/2018 | |
| CN | 108199005 | A | 6/2018 | |
| CN | 108258249 | A | 7/2018 | |
| CN | 108281662 | A | 7/2018 | |
| CN | 108306013 | A | 7/2018 | |
| CN | 108539252 | A | 9/2018 | |
| CN | 108598491 | A | 9/2018 | |

(56) References Cited

FOREIGN PATENT DOCUMENTS

| | | |
|---|---|---|
| CN | 108666525 A | 10/2018 |
| CN | 108682788 A | 10/2018 |
| CN | 108832134 A | 11/2018 |
| CN | 109004171 A | 12/2018 |
| CN | 109103490 A | 12/2018 |
| CN | 208298924 U | 12/2018 |
| CN | 109216675 A | 1/2019 |
| CN | 109216703 A | 1/2019 |
| CN | 109273668 A | 1/2019 |
| CN | 208507818 U | 2/2019 |
| CN | 109546154 A | 3/2019 |
| CN | 109546204 A | 3/2019 |
| CN | 109873160 A | 6/2019 |
| CN | 109873160 U | 6/2019 |
| CN | 109873161 A | 6/2019 |
| CN | 109873163 A | 6/2019 |
| CN | 109873164 A | 6/2019 |
| CN | 109873166 A | 6/2019 |
| CN | 208955108 U | 6/2019 |
| CN | 110660957 B | 12/2020 |
| CN | 110661001 B | 12/2020 |
| EP | 1551070 A1 | 7/2005 |
| EP | 2903063 A1 | 8/2015 |
| EP | 3182487 A1 | 6/2017 |
| EP | 3367485 A1 | 8/2018 |
| EP | 3389122 A1 | 10/2018 |
| EP | 3796423 A1 | 3/2021 |
| EP | 3796436 A1 | 3/2021 |
| JP | H1167277 A | 3/1999 |
| JP | 2003282064 A | 10/2003 |
| JP | 2003297353 A | 10/2003 |
| JP | 2008258055 A | 10/2008 |
| JP | 2010027530 A | 2/2010 |
| JP | 2013178953 A | 9/2013 |
| JP | 2013254692 A | 12/2013 |
| JP | 2015115233 A | 6/2015 |
| JP | 2017021888 A | 1/2017 |
| JP | 2018049825 A | 3/2018 |
| JP | 2018073723 A | 5/2018 |
| JP | 2018156787 A | 10/2018 |
| JP | 2018174107 A | 11/2018 |
| JP | 2018190656 A | 11/2018 |
| KR | 20140137660 A | 12/2014 |
| KR | 20180000183 A | 1/2018 |
| WO | 2008115168 A2 | 9/2008 |
| WO | 2011029058 A2 | 3/2011 |
| WO | 2012127561 A1 | 9/2012 |
| WO | WO-2015020338 A1 * | 2/2015 ............ H01M 10/05 |
| WO | 2018180742 A1 | 10/2018 |
| WO | 2018207643 A1 | 11/2018 |
| WO | 2019109928 A1 | 6/2019 |

OTHER PUBLICATIONS

International Search Report and Written Opinion, PCT/CN2019/129352, Mar. 27, 2020, 20 pgs.
Office Action, CN201910299179.8, Sep. 2, 2020, 9 pgs.
Office Action, CN201910299179.8, Dec. 9, 2020, 6 pgs.
The international search report received in the corresponding International Application PCT/CN2019/119739, mailed Jan. 14, 2020.
The written opinion of ISA received in the corresponding International Application PCT/CN2019/119739, mailed Jan. 14, 2020.
The extended European search report received in the corresponding European Application 19902406.8, mailed Aug. 5, 2021.
The first office action received in the corresponding Chinese Application 201811642323.5, mailed Jun. 3, 2020.
The non-final office action received in the corresponding U.S. Appl. No. 17/112,766, mailed Jan. 31, 2024.
The international search report received in the corresponding International Application PCT/CN2019/117142, mailed Feb. 3, 2020.
The written opinion of ISA received in the corresponding International Application PCT/CN2019/117142, mailed Feb. 3, 2020.
The first office action received in the corresponding Chinese Application 201811644245.2, mailed Jun. 9, 2020.
The extended European search report received in the corresponding European Application 19905423.0, mailed Sep. 10, 2021.
Pszczólkowski Bartosz et al: "A Comparative Analysis of Selected Methods for Determining Young's Modulus in Polylactic Acid Samples Manufactured with the FDM Method", Materials, vol. 15, No. 1, Dec. 25, 2021 (Dec. 25, 2021), p. 149.
The first office action received in the corresponding European Application 19905423.0, mailed Feb. 6, 2023.
The final office action received in the corresponding U.S. Appl. No. 17/132,548, mailed Jun. 6, 2023.
The international search report received in the corresponding International Application PCT/CN2019/117143, mailed Mar. 11, 2020.
The written opinion of ISA received in the corresponding International Application PCT/CN2019/117143, mailed Mar. 11, 2020.
The extended European search report received in the corresponding European Application 19906208.4, mailed Sep. 10, 2021.
The first office action received in the corresponding Chinese Application 201811638645.2, mailed Jun. 16, 2020.
The third office action received in the corresponding Chinese Application 201811644244.8, mailed Jan. 12, 2021.
The extended European search report received in the corresponding European Application 19903066.9, mailed Jul. 19, 2021.
The non-final office action received in the corresponding U.S. Appl. No. 17/059,503, mailed Aug. 30, 2023.
The international search report received in the corresponding International Application PCT/CN2019/119717, mailed Jan. 23, 2020.
The written opinion of ISA received in the corresponding International Application PCT/CN2019/119717, mailed Jan. 23, 2020.
The first office action received in the corresponding Chinese Application 201811638405.2, mailed Jun. 9, 2020.
The extended European search report received in the corresponding European Application 19902246.8, mailed Nov. 29, 2021.
The first office action received in the corresponding European Application 19902246.8, mailed Jul. 1, 2022.
The non-final office action received in the corresponding U.S. Appl. No. 17/335,034, mailed Mar. 31, 2023.
The first office action received in the corresponding Chinese Application 201910580127.8, mailed Mar. 19, 2021.
The second office action received in the corresponding Chinese Application 201910580127.8, mailed Jun. 16, 2021.
The international search report received in the corresponding International Application PCT/CN2019/125061, mailed Mar. 12, 2020.
The written opinion of ISA received in the corresponding International Application PCT/CN2019/125061, mailed Mar. 12, 2020.
The first office action received in the corresponding Chinese Application 201910299297.9, mailed Aug. 20, 2020.
The Notification to Grant Patent Right for Invention received in the corresponding Chinese Application 201910299297.9, mailed Nov. 27, 2020.
The international search report received in the corresponding International Application PCT/CN2019/129356, mailed Mar. 26, 2020.
The written opinion of ISA received in the corresponding International Application PCT/CN2019/129356, mailed Mar. 26, 2020.
The international search report received in the corresponding International Application PCT/CN2019/129354, mailed Mar. 26, 2020.
The written opinion of ISA received in the corresponding International Application PCT/CN2019/129354, mailed Mar. 26, 2020.
The first office action received in the corresponding Chinese Application 201910299937.6, mailed Sep. 1, 2020.
The extended European search report received in the corresponding European Application 19924802.2, mailed Apr. 26, 2022.
The first office action received in the corresponding European Application 19906208.4, mailed Mar. 6, 2023.
The first office action received in the corresponding Chinese Application 201811638781.1, mailed Jun. 4, 2020.
The extended European search report received in the corresponding European Application 19905422.2, mailed Sep. 9, 2021.
The international search report received in the corresponding International Application PCT/CN2019/117141, mailed Feb. 5, 2020.
The written opinion of ISA received in the corresponding International Application PCT/CN2019/117141, mailed Feb. 5, 2020.

(56) References Cited

OTHER PUBLICATIONS

The first office action received in the corresponding Chinese Application 201910299473.9, mailed Aug. 18, 2020.
The notice of allowance received in the corresponding Chinese Application 201910299473.9, mailed Oct. 18, 2021.
The extended European search report received in the corresponding European Application 19925225.5, mailed Mar. 22, 2022.
The non-final office action received in the corresponding U.S. Appl. No. 17/501,905, mailed Sep. 14, 2023.
The international search report received in the corresponding International Application PCT/CN2019/129357, mailed Jan. 23, 2020.
The written opinion of ISA received in the corresponding International Application PCT/CN2019/129357, mailed Jan. 23, 2020.
The international search report received in the corresponding International Application PCT/CN2019/129360, mailed Apr. 1, 2020.
The written opinion of ISA received in the corresponding International Application PCT/CN2019/129360, mailed Apr. 1, 2020.
The extended European search report received in the corresponding European Application 19933228.9, mailed Sep. 30, 2021.
The first office action received in the corresponding Chinese Application 201910586647.X, mailed Jun. 16, 2023.
The notification to grant patent right for invention eceived in the corresponding Chinese Application 201910586647.X, mailed Aug. 15, 2023.
MatWeb, Material Property Data Sheet for Aluminum, 2021.
The non-final office action received in the corresponding U.S. Appl. No. 17/139,124, mailed Mar. 19, 2021.
The non-final office action received in the corresponding U.S. Appl. No. 17/139,124, mailed Aug. 10, 2022.
MatWeb, Datasheet for Aluminum, 2022.
The final office action received in the corresponding U.S. Appl. No. 17/139,124, mailed Apr. 11, 2022.
The notice of allowance received in the corresponding U.S. Appl. No. 17/139,124, mailed Aug. 23, 2023.
The international search report received in the corresponding International Application PCT/CN2019/119700, mailed Feb. 19, 2020.
The written opinion of ISA received in the corresponding International Application PCT/CN2019/119700, mailed Feb. 19, 2020.
The extended European search report received in the corresponding European Application 19902910.9, mailed Jul. 8, 2021.
The first office action received in the corresponding Chinese Application 201811637655.4, mailed Jun. 16, 2020.
The third office action received in the corresponding Chinese Application 201811638645.2, mailed Sep. 18, 2021.
Eunice K Wong et al:"Battery Separator Characterization and Evaluation Procedures for NASA's Advanced Lithium-Ion Batteries", published May 1, 2010.
Pszczolkowski Bartosz et al:"A Comparative Analysis of Selected Methods for Determining Young's Modulus in Polylactic Acid Samples Manufactured with the FDM Method" Materials, vol. 15, No. 1, Dec. 25, 2021 (Dec. 25, 2021), p. 149, XP093019570, DOI: 10.3390/ma15010149.
"Temperature-Compensated Crystal Oscillator" Elektor Electronics Elektor Electronics GB vol. 25, No. 279, Jul. 1, 1999, p. 54/55.
The final office action received in the corresponding U.S. Appl. No. 17/112,749, mailed Mar. 14, 2024.
The extended European search report received in the corresponding European Application 19924692.7, mailed Mar. 21, 2022.
The Non-Final Office Action received in the counterpart U.S. Appl. No. 17/501,902, mailed May 7, 2024.
The Non-Final Office Action received in the counterpart U.S. Appl. No. 17/059,503, mailed on Jun. 21, 2024.
The extended European Search Report received in the counterpart European Application 23220585.6, mailed on May 15, 2024.
The Final Office Action received in the counterpart U.S. Appl. No. 17/501,902, mailed on Aug. 26, 2024.
The Final Office Action received in the counterpart U.S. Appl. No. 17/112,766, mailed on Jul. 11, 2024.
The Non-Final Office Action received in the counterpart U.S. Appl. No. 17/540,263, mailed on Nov. 21, 2024.

* cited by examiner

ELECTRODE PLATE, ELECTROCHEMICAL APPARATUS, AND APPARATUS

CROSS-REFERENCE TO RELATED APPLICATIONS

This application is a continuation application of PCT Patent Application No. PCT/CN2019/129352, entitled "ELECTRODE PLATE, ELECTROCHEMICAL APPARATUS, AND APPARATUS" filed on Dec. 27, 2019, which claims priority to Chinese Patent Application No. 201910299179.8, filed with China National Intellectual Property Administration on Apr. 15, 2019 and entitled "ELECTRODE PLATE AND ELECTROCHEMICAL APPARATUS", both of which are incorporated herein by reference in their entirety.

TECHNICAL FIELD

This application relates to the battery field, and specifically, to an electrode plate, an electrochemical apparatus, and an apparatus.

BACKGROUND

Lithium-ion batteries are widely applied to electromobiles and consumer electronic products due to their advantages such as high energy density, high output power, long cycle life, and low environmental pollution. With continuous expansion of the application scope of lithium-ion batteries, requirements for gravimetric energy density and volumetric energy density of the lithium-ion batteries are increasingly high.

In order to obtain a lithium-ion battery with higher mass energy density and volumetric energy density, the following improvements are usually made to the lithium-ion batteries: (1) selecting a positive electrode material or a negative electrode material with high specific discharge capacity; (2) optimizing a mechanical design of the lithium-ion battery to minimize its volume; (3) selecting a positive electrode plate or a negative electrode plate with high compacted density; (4) reducing weight of each component of the lithium-ion battery.

A current collector is usually improved by selecting a lighter or thinner current collector. For example, a perforated current collector or a plastic current collector with a metal coating layer may be used.

For an electrode plate and a battery using the plastic current collector with the metal coating layer, although the energy density is increased, some performance degradation may occur in terms of processing performance and electrochemical performance. To obtain an electrode plate and a current collector with good electrochemical performance, improvements in many aspects are still required.

This application is hereby proposed to overcome the disadvantages in the prior art.

SUMMARY

In view of this, this application provides an electrode plate, an electrochemical apparatus, and an apparatus.

According to a first aspect, this application relates to an electrode plate, including a current collector and an electrode active material layer disposed on at least one surface of the current collector. The current collector includes a support layer and a conductive layer disposed on at least one surface of the support layer, where single-side thickness D2 of the conductive layer satisfies: 30 nm≤D2≤3 µm, the support layer includes a polymer material or a polymer composite material, and thickness D1 of the support layer satisfies: 1 µm≤D1≤20 µm. The electrode active material layer includes an electrode active material, a binder, and a conductive agent, where total thickness $D_{total}$ of the electrode active material layer satisfies: 200≥$D_{total}$/D1≥1, and based on total weight of the electrode active material layer, the binder content in the electrode active material layer is not less than 1 wt %.

According to a second aspect, this application relates to an electrochemical apparatus, including a positive electrode plate, a negative electrode plate, a separator, and an electrolyte, where the positive electrode plate and/or the negative electrode plate are/is the electrode plate in the first aspect of this application.

According to a third aspect, this application relates to an apparatus, including the electrochemical apparatus in the second aspect of this application.

The technical solutions of this application have at least the following beneficial effects:

First, the positive electrode plate in this application uses a composite current collector. Because the composite current collector has a relatively thin conductive layer and the support layer includes the polymer material or the polymer composite material, the energy density of the electrochemical apparatus can be significantly improved, such as mass energy density.

Second, because the composite current collector has a relatively thin conductive layer, in unexpected situations such as nail penetration, metal burrs generated are relatively small, and the support layer with the polymer material or the polymer composite material is used. Therefore, short-circuit resistance is greater than that of a conventional metal current collector in unexpected situations such as nail penetration, thereby greatly improving nail penetration safety performance of the electrochemical apparatus.

Third, because a thickness ratio of the electrode active material layer to the support layer is appropriate and the binder content in the electrode active material layer is relatively high, technical problems such as poor bonding force between the composite current collector and the electrode active material layer caused by greater rebound (compared with that of the conventional metal current collector) of the support layer of the polymer material or the polymer composite material during electrode plate processing (such as roll-in), and relatively great internal resistance and great polarization generated by this can be resolved.

In addition, based on the electrode plate in some implementations of this application, a conductive primer layer including the conductive material and a binder is additionally disposed between the composite current collector and the electrode active material layer. The conductive primer layer may further improve the bonding force between the active material layer and the composite current collector, and by effectively mending and constructing a conductive network among the current collector, the conductive primer layer, and the active material, can also improve electron transfer efficiency, and reduce resistance between the current collector and the electrode active material layer, thereby overcoming disadvantages such as a relatively poor conductive capability of the composite current collector and breakage vulnerability of the conductive layer in the composite current collector. In this way, the direct current resistance in the electrode assembly may be effectively reduced, the power performance of the electrode assembly is improved, and the electrode assembly is ensured not prone to phenomena such as relatively large polarization and lithium plating during long-term cycling. That is, the long-term reliability of the electrode assembly is effectively improved.

In addition, the binder content in the electrode active material layer of the electrode plate in some implementations of this application is not less than 1.5 wt %, and more specifically, not less than 2 wt %, so that bonding force between the active material layer and the composite current collector is increased, and in unexpected situations such as nail penetration, the active material layer can effectively wrap metal burrs generated in the conductive layer, to better improve nail penetration safety performance of the battery.

In addition, based on the electrode plate in some implementations of this application, based on compacted density, the electrode active material layer includes $2n+1$ ($n=1$, 2, or 3) areas, and compacted density of a middle area is greater than compacted density of areas on two sides. Such special partition design can effectively suppress curvature and edge warping of the composite current collector and the electrode plate caused by roll-in and the like. This ensures that the electrode plate maintains good flatness after roll-in, and helps protect the conductive layer from damage, thereby ensuring good electrochemical performance of the electrode plate.

The apparatus in this application includes the electrochemical apparatus in the second aspect of this application, and therefore, has at least the same advantages as the electrochemical apparatus.

Therefore, the electrode plate, the electrochemical apparatus (such as the lithium-ion battery) including the electrode plate, and the apparatus in this application have good energy density, electrochemical performance, and safety performance.

BRIEF DESCRIPTION OF DRAWINGS

The following describes an electrode plate, an electrochemical apparatus, an apparatus, and beneficial effects thereof in this application in detail with reference to the accompanying drawings and specific implementations.

Figure 1:
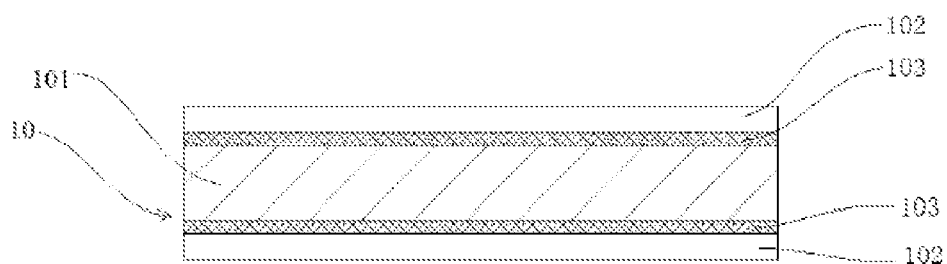
FIG. 1 is a schematic cross-sectional view of a positive current collector according to a specific implementation of this application.

In the drawings:
PP. positive electrode plate;
10. positive current collector;
101. positive support layer;
102. positive conductive layer;
103. positive protective layer;
12. conductive primer layer;
11. positive active material layer;
NP. negative electrode plate;
20. negative current collector;
201. negative support layer;
202. negative conductive layer;
203. negative protective layer;
22. conductive primer layer;
21. negative active material layer;
511. tab;
512. clear area;
513. first area with low compacted density;
514. area with high compacted density;
515. second area with low compacted density;
1. battery pack;
2. upper box body;
3. lower box body;
4. battery module; and
5. electrochemical apparatus.

DESCRIPTION OF EMBODIMENTS

The following further describes this application with reference to specific embodiments. It should be understood that these specific embodiments are merely intended to illustrate this application but not to limit the scope of this application.

According to a first aspect, this application relates to an electrode plate, including a current collector and an electrode active material layer disposed on at least one surface of the current collector. The current collector includes a support layer and a conductive layer disposed on at least one surface of the support layer, where single-side thickness D2 of the conductive layer satisfies: 30 nm≤D2≤3 µm, the support layer includes a polymer material or a polymer composite material, and thickness D1 of the support layer satisfies: 1 µm≤D1≤20 µm. The electrode active material layer includes an electrode active material, a binder, and a conductive agent, where total thickness $D_{total}$ of the electrode active material layer satisfies: $200 \geq D_{total}/D1 \geq 1$, and based on total weight of the electrode active material layer, the binder content in the electrode active material layer is not less than 1 wt %.

Obviously, the electrode plate may be a positive electrode plate or a negative electrode plate. When the electrode plate is a positive electrode plate, correspondingly, the current collector and the electrode active material layer therein are a positive current collector and a positive active material layer, respectively. When the electrode plate is a negative electrode plate, correspondingly, the current collector and the electrode active material layer therein are a negative current collector and a negative active material layer, respectively.

The current collector used for the electrode plate in the first aspect of this application is a composite current collector, and the composite current collector is composed of at least two materials. In terms of structure, the current collector includes a support layer and a conductive layer disposed on at least one surface of the support layer, and single-side thickness D2 of the conductive layer satisfies: 30 nm≤D2≤3 µm. Therefore, it is the conductive layer in the current collector that plays a role of conducting electricity. The thickness D2 of the conductive layer is much less than thickness of metal current collector such as Al foil or Cu foil commonly used in the prior art (the thickness of commonly used Al foil and Cu foil metal current collector is usually 12 µm and 8 µm). Therefore, mass energy density and volumetric energy density of the electrochemical apparatus (for example, a lithium battery) using the electrode plate can be increased. In addition, when the composite current collector is applied to the positive current collector, nail penetration safety performance of the positive electrode plate can also be greatly improved. This is because the composite current collector is provided with a relatively thin conductive layer. Therefore, in unexpected situations such as nail penetration, metal burrs generated are relatively small. In addition, the composite current collector also has a support layer provided by a polymer material or a polymer composite material. Therefore, short-circuit resistance is greater than that of a conventional metal current collector in unexpected situations such as nail penetration. These factors jointly greatly improve nail penetration safety performance of the electrochemical apparatus.

However, because the support layer of the composite current collector includes the polymer material or the polymer composite material, the support layer of the composite current collector has a greater rebound degree than a conventional metal current collector during electrode plate processing (for example, a process such as roll-in). Therefore, both bonding force between the support layer and the conductive layer and bonding force between the composite current collector and the electrode active material layer preferably need to be enhanced. Otherwise, technical problems such as relatively great internal resistance and relatively great polarization are prone to arise. However, in the electrode plate according to this application, a thickness ratio of the electrode active material layer to the support layer is appropriate, and the amount of binder content in the active material layer is relatively high, thereby overcoming technical problems such as poor bonding force between the composite current collector and the electrode active material layer caused by the rebound of the support layer during processing, and great internal resistance and great polarization of the electrode plate.

In addition, because the polymer support layer of the composite current collector has a greater rebound degree than that of the conventional metal current collector, if the current collector is coated and then compacted through a roll-in process according to a conventional process, a series of other problems may arise. Due to the rebound of the support layer, edges on both sides of the electrode plate are wrapped upward, and as a result, the entire electrode plate has a curvature, thereby causing deformation of the electrode plate. Deformation of the electrode plate may cause separation between the electrode active material layer and the composite current collector, breakage of the conductive layer, peeling of the conductive layer from the support layer, and the like, thereby deteriorating electrochemical performance of the electrode plate. On the other hand, the deformation of the electrode plate will also make the positive electrode plate and the negative electrode plate unable to accurately align. Therefore, the electrode plate prepared by using the composite current collector is prone to technical problems such as relatively great internal resistance and relatively great polarization. In the prior art, to resolve the deformation problem of the electrode plate that is caused by the composite current collector, some special technical measures usually need to be taken to release stress during a slurry drying process of the active material or the roll-in process, or a yield rate is inevitably compromised when a conventional process is used. In view of this, in an implementation of this application, in addition to designing of material distribution in a thickness direction of the electrode plate, material distribution in a traverse direction of the active material layer of the electrode plate (that is, a direction parallel to a surface of the electrode plate) is also specially designed. According to the implementation of this application, based on compacted density, the electrode active material layer of the electrode plate includes 2n+1 (n=1, 2, or 3) areas distributed in a width direction of the electrode plate (that is, a direction perpendicular to a coating direction), and compacted density of a middle area is greater than compacted density of areas on two sides. Such special partition design can effectively suppress curvature and edge warping of the composite current collector and the electrode plate caused by roll-in and the like. This ensures that the electrode plate maintains good flatness after roll-in, and this eliminates or reduces technical problems such as relatively great internal resistance and relatively great polarization of the electrode plate, and helps protect the conductive layer from damage, thereby ensuring good electrochemical performance of the electrode plate and the electrochemical apparatus. Therefore, the electrode plate in this application have good energy density, electrochemical performance, and safety performance at the same time, and an electrode plate, an electrochemical apparatus (such as a lithium-ion battery), and an apparatus with excellent comprehensive performance can be provided.

In addition, due to a relatively thin conductive layer of this composite current collector, compared to the conventional metal current collector (Al foil or Cu foil), the composite current collector has poorer conductivity, and the conductive layer is prone to damage in the electrode plate processing process, further affecting the electrochemical performance of the electrochemical apparatus. In the electrode plate in some implementations of this application, a conductive primer layer including the conductive material and a binder is also additionally disposed between the current collector and the electrode active material layer. Specifically, the conductive primer layer is disposed between the conductive layer of the current collector and the electrode active material layer. Therefore, the conductive primer layer could improve the interface between the composite current collector and the electrode active material layer, further increase the bonding force between the current collector and the electrode active material layer, and ensure that the electrode active material layer is more firmly disposed on the surface of the composite current collector. In addition, the conductive primer layer could overcome shortcomings such as poor conductivity of the composite current collector and vulnerability of the conductive layer in the composite current collector. By effectively mending and constructing a conductive network among the current collector, the conductive primer layer, and the active material, the conductive primer layer improves the electron transfer efficiency, and reduces the resistance of the electrode plate including the composite current collector. In this way, the direct current resistance (DCR) in the electrode assembly may be effectively reduced, the power performance of the electrode assembly is improved, and the electrode assembly is ensured not prone to phenomena such as relatively large polarization and lithium plating during long-term cycling. That is, the long-term reliability of the electrode assembly is effectively improved.

The following describes in detail a structure, a material, performance, and the like of the electrode plate (and the current collector in the electrode plate) in an implementation of this application.

[Conductive Layer of a Current Collector]

In comparison with a conventional metal current collector, in the current collector in an implementation of this application, the conductive layer has a conductive function and a current collection function, and is configured to provide electrons for the electrode active material layer.

The material of the conductive layer is selected from at least one of a metal conductive material and a carbon-based conductive material.

The metal conductive material is selected from at least one of aluminum, copper, nickel, titanium, silver, nickel-copper alloy, and aluminum-zirconium alloy.

The carbon-based conductive material is selected from at least one of graphite, acetylene black, graphene, and carbon nanotube.

The material of the conductive layer is a metal conductive material, that is, the conductive layer is preferably a metal conductive layer. When the current collector is a positive current collector, aluminum is usually used as the material of the conductive layer; or when the current collector is a negative current collector, copper is usually used as the material of the conductive layer.

When the conductive layer has poor conductivity or too small thickness, the internal resistance and polarization of the battery may be large; or when the conductive layer is too thick, an effect of improving mass energy density and volumetric energy density of the battery cannot be achieved.

The single-side thickness of the conductive layer is D2. D2 satisfies: 30 nm≤D2≤3 μm, more specifically 300 nm≤D2≤2 μm, and most specifically 500 nm≤D2≤1.5 μm, to better ensure light weight and good conductivity of the current collector.

In an implementation of this application, an upper limit of the single-side thickness D2 of the conductive layer may be 3 μm, 2.5 μm, 2 μm, 1.8 μm, 1.5 μm, 1.2 μm, 1 μm, and 900 nm, and a lower limit of the single-side thickness D2 of the conductive layer may be 800 nm, 700 nm, 600 nm, 500 nm, 450 nm, 400 nm, 350 nm, 300 nm, 100 nm, 50 nm, and 30 nm. The range of the single-side thickness D2 of the conductive layer may be composed of any values of the upper limit or the lower limit. Preferably, 300 nm≤D2≤2 μm; and more specifically, 500 nm≤D2≤1.5 μm.

Because the thickness of the conductive layer in this application is relatively small, damages such as cracks are prone to occur in a process such as production of the electrical plate. Generally, cracks exist in the conductive layer of the electrode plate in this application. The cracks in the conductive layer usually exist irregularly in the conductive layer. The cracks may be elongated cracks, cross-shaped cracks, divergent cracks, and the like, or the cracks may be cracks that penetrate the entire conductive layer, or may be formed on the surface of the conductive layer. Cracks in the conductive layer are usually caused by the roll-in during the electrode plate processing, the excessive amplitude of a welded tab, and the excessive reeling tension of a substrate.

The conductive layer may be formed on the support layer through at least one of mechanical roll-in, bonding, vapor deposition (vapor deposition), and electroless plating (Electroless plating). The vapor deposition method is physical vapor deposition (Physical Vapor Deposition, PVD). The physical vapor deposition method is preferably at least one of an evaporating method and a sputtering method. The evaporating method is at least one of vacuum evaporating (vacuum evaporating), thermal evaporation deposition (Thermal Evaporation Deposition), and electron beam evaporation method (electron beam evaporation method, EBEM). The sputtering method is magnetron sputtering (Magnetron sputtering).

In some embodiments, at least one of vapor deposition or electroless plating is used, so that the support layer and the conductive layer are more tightly bonded.

[Support Layer of a Current Collector]

In the current collector in an implementation of this application, the support layer has functions of supporting and protecting the conductive layer. Since the support layer generally uses an organic polymer material, density of the support layer is usually lower than density of the conductive layer, which can significantly increase the mass energy density of the battery compared to a conventional metal current collector.

In addition, the metal layer having smaller thickness is used, which can further increase the mass energy density of the battery. In addition, because the support layer can well support and protect the conductive layer on a surface of the support layer, a common fracture phenomenon of an electrode plate in the conventional current collector is not prone to occur.

The material of the support layer is selected from at least one of an insulating polymer material, an insulating polymer composite material, a conductive polymer material, and a conductive polymer composite material.

The insulating polymer material is, for example, selected from at least one of polyamide, polyterephthalate, polyimide, polyethylene, polypropylene, polystyrene, polyvinyl chloride, aramid, polydiformylphenylenediamine, acrylonitrile-butadiene-styrene copolymer, polybutylene terephthalate, poly(p-phenylene terephthalamide), poly(p-phenylene ether), polyoxymethylene, epoxy resin, phenolic resin, polytetrafluoroethylene, polyphenyl sulfide, polyvinylidene fluoride, silicone rubber, polycarbonate, cellulose and its derivatives, starch and its derivatives, protein and its derivatives, polyvinyl alcohol and its cross-linked products, and polyethylene glycol and its cross-linked products.

The insulating polymer composite material is, for example, selected from a composite material formed of an insulating polymer material and an inorganic material, where the inorganic material is at least one of a ceramic material, a glass material, and a ceramic composite material.

The conductive polymer material is, for example, selected from a polysulfur nitride polymer material or a doped conjugated polymer material, such as at least one of polypyrrole, polyacetylene, polyaniline, and polythiophene.

The conductive polymer composite material is, for example, selected from a composite material formed of an insulating polymer material and a conductive material, where the conductive material is selected from at least one of a conductive carbon material, a metal material, and a composite conductive material, the conductive carbon material is selected from at least one of carbon black, carbon nanotube, graphite, acetylene black, and graphene, the metal material is selected from at least one of nickel, iron, copper, aluminum or alloy of the foregoing metal, and the composite conductive material is selected from at least one of nickel-coated graphite powder and nickel-coated carbon fiber.

A person skilled in the art can appropriately select and determine the material of the support layer based on an actual need of the application environment, costs and other factors. In this application, the material of the support layer is an insulating polymeric material or an insulating polymeric composite material, especially when the current collector is a positive current collector.

When the current collector is a positive current collector, the safety performance of the battery can be significantly improved by using a special current collector supported by an insulation layer and having a conductive layer with a specific thickness. Since the insulation layer is non-conductive, its resistance is relatively large, which can increase the short-circuit resistance when the battery is short-circuited in unexpected situations, and greatly reduce the short-circuit current. Therefore, the heat generated by the short circuit can be greatly reduced, thereby improving the safety performance of the battery. In addition, the conductive layer is relatively thin, so that in unexpected situations such as nail penetration, the local conductive network is cut off, preventing a large area of the electrochemical apparatus or even the entire electrochemical apparatus from being short-circuited. This can limit the damage of the electrochemical apparatus caused by nail penetration to a puncture site, only forming a "point disconnection" without affecting the normal operation of the electrochemical apparatus within a period of time.

The thickness of the support layer is D1, and D1 satisfies: $1\ \mu m \leq D1 \leq 20\ \mu m$, and more specifically $1\ \mu m \leq D1 \leq 15\ \mu m$.

If the support layer is too thin, the mechanical strength of the support layer is insufficient, and breakage easily occurs during the process such as the electrode plate processing process; if the support layer is too thick, the volumetric energy density of the battery using the current collector will be reduced.

The upper limit of the thickness D1 of the support layer may be 20 µm, 15 µm, 12 µm, 10 µm, and 8 µm, and a lower limit may be 1 µm, 1.5 µm, 2 µm, 3 µm, 4 µm, 5 µm, 6 µm, and 7 µm; and the range of the thickness D1 of the support layer may be composed of any values of the upper limit or lower limit. In some embodiments, $1\ \mu m \leq D1 \leq 15\ \mu m$, more specifically $2\ \mu m \leq D1 \leq 10\ \mu m$, and most specifically $3\ \mu m \leq D1 \leq 8\ \mu m$.

In addition, the specific thickness in this application can further ensure that the current collector has great resistance, and significantly reduce a battery temperature increase when a short circuit occurs in the battery. When the conductive layer is made of aluminum, this can further significantly reduce or prevent a thermit reaction of the positive current collector, and ensure good safety performance of the battery.

In addition, when the conductive layer is a metal conductive layer, the room-temperature Young's modulus of the support layer satisfies: $20\ \text{GPa} \geq E \geq 4\ \text{GPa}$.

In this application, a method for testing the room-temperature Young's modulus of the support layer is as follows:

Take a support layer sample and cut it into 15 mm×200 mm, measure the thickness h (µm) of the sample with a micrometer. Use a Gotech tensile machine under room temperature and pressure to carry out a tensile test, set an initial position, and make the sample between clamps 50 mm long. Stretching is carried out at a speed of 50 mm/min. Record the load L(N) and the displacement y (mm) of the equipment when the sample is stretched to break, then the stress $\varepsilon = L/(15*h)*1000$, and the strain $\eta = y/50*100$. Draw a stress-strain curve, and take the curve in the initial linear region, where the slope of this curve is the Young's modulus E.

Since metal is more rigid than polymer or polymer composite materials, that is, the deformation is small during the roll-in process of the electrode plate processing, in order to ensure that a deformation difference between the support layer and the conductive layer is not too large to tear the conductive layer, the room-temperature Young's modulus of the support layer should satisfy: $20\ \text{GPa} \geq E \geq 4\ \text{GPa}$, so that the support layer can have a rigidity, and the rigidity matching between the support layer and the conductive layer can be further improved. This ensures that the difference in the deformations of the supporting layer and the conductive layer will not be too large during the processing of the current collector and the electrode plate.

Since the support layer has a rigidity ($20\ \text{GPa} \geq E \geq 4\ \text{GPa}$), the current collector is not easy to deform or stretch too much during the processing of the current collector and the electrode plate, so that the support layer and the conductive layer can be firmly bonded, not easy to detach, and can prevent damage to the conductive layer caused by the conductive layer being "forced" to stretch. In addition, the current collector in this application has some tenacity, thereby ensuring that the current collector and the electrode plate have some capabilities to withstand deformation and are not prone to band breakage.

However, the Young's modulus of the support layer cannot be too large; otherwise, the rigidity is too strong, which will cause reeling and winding difficulties, and poor workability. When $20\ \text{GPa} \geq E$, the support layer can be guaranteed to have flexibility, and the electrode plates can also have an ability to withstand deformation.

In addition, heat shrinkage rate of the support layer at 90° C. is preferably not greater than 1.5%, to better ensure the thermal stability of the current collector during the processing of the electrode plate.

[Protective Layer of a Current Collector]

In some implementations of this application, the current collector is further provided with a protective layer. The protective layer is disposed on one surface of the conductive layer of the current collector or disposed on two surfaces of the conductive layer of the current collector, that is, a surface of the conductive layer away from the support layer and a surface facing the support layer.

The protective layer may be a metal protective layer or a metal oxide protective layer. The protective layer can prevent the conductive layer of the current collector from being damaged by chemical corrosion or mechanical damage, and can also enhance the mechanical strength of the current collector.

Preferably, the protective layer is disposed on both surfaces of the conductive layer of the current collector. The lower protective layer of the conductive layer (that is, the protective layer disposed on the surface of the conductive layer facing the support layer) can not only prevent damage to the conductive layer and enhance the mechanical strength of the current collector, but also enhance the bonding force between the support layer and the conductive layer to prevent peeling (that is, the separation of the support layer from the conductive layer).

The technical effect of the upper protective layer of the conductive layer (that is, the protective layer disposed on the surface of the conductive layer away from the support layer) is mainly to prevent the conductive layer from being damaged and corroded during processing (for example, electrolyte immersion and roll-in may affect the surfaces of the conductive layer). In the electrode plate of this application, a conductive primer layer is used to mend the cracks that may occur in the conductive layer during the processes such as roll-in and winding, enhance the conductivity, and make up for the composite current collector as the current collector. Therefore, the upper protective layer of the conductive layer can cooperate with the conductive primer layer to further provide protection for the conductive layer, thereby jointly improving the conductive effect of the composite current collector used as the current collector.

Due to the good conductivity, the metal protective layer can not only further improve the mechanical strength and corrosion resistance of the conductive layer, but also reduce the polarization of the electrode plate. The material of the metal protective layer is, for example, selected from at least one of nickel, chromium, nickel-based alloy, and copper-based alloy, more specifically nickel or nickel-based alloy.

The nickel-based alloy is an alloy formed by adding one or more other elements to pure nickel as the matrix. Preferably, it is a nickel-chromium alloy. The nickel-chromium alloy is an alloy formed of metallic nickel and metallic chromium. Optionally, the molar ratio of nickel to chromium is 1:99 to 99:1.

Copper-based alloy is an alloy formed by adding one or more other elements to pure copper used as the matrix. Preferably, it is a copper-nickel alloy. Optionally, in the copper-nickel alloy, the molar ratio of nickel to copper is 1:99 to 99:1.

When a metal oxide is selected for the protective layer, due to its low ductility, large specific surface area, and high hardness, it can also form effective support and protection for the conductive layer, and have a good technical effect on improving the bonding force between the support layer and the conductive layer. The material of the metal oxide protective layer is, for example, selected from at least one of aluminum oxide, cobalt oxide, chromium oxide, and nickel oxide.

When used as a positive current collector, the composite current collector according to this application uses metal oxide as its protective layer to further improve safety performance of the positive electrode plate and battery while achieving a good technical effect of support and protection. When used as a negative current collector, the composite current collector according to this application uses metal as its protective layer to further improve conductivity of the electrode plate and kinetic performance of the battery to further reduce polarization of the battery, while achieving a good technical effect of support and protection.

The thickness of the protective layer is D3, and D3 satisfies: $D3 \leq \frac{1}{10}D2$, and 1 nm$\leq$D3$\leq$200 nm. If the protective layer is too thin, it is not enough to protect the conductive layer; if the protective layer is too thick, the mass energy density and the volumetric energy density of the battery will be reduced. More specifically, 5 nm$\leq$D3$\leq$500 nm, further specifically 10 nm$\leq$D3$\leq$200 nm, most specifically 10 nm$\leq$D3$\leq$50 nm.

The materials of the protective layers on the two surfaces of the conductive layer may be the same or different, and the thickness may be the same or different.

Preferably, the thickness of the lower protective layer is less than the thickness of the upper protective layer to help improve the mass energy density of the battery.

Further in some embodiments, the ratio of the thickness D3" of the lower protective layer to the thickness D3' of the upper protective layer is: $\frac{1}{2} D3' \leq D3'' \leq \frac{4}{5} D3'$.

When the current collector is a positive current collector, aluminum is usually used as the material of the conductive layer, and a metal oxide material is selected for the lower protective layer. Compared with the choice of metal used for the lower protective layer, the metal oxide material has a larger resistance. Therefore, this type of lower protective layer can further increase the resistance of the positive current collector to some extent, thereby further increasing the short circuit resistance of the battery in the event of a short circuit in unexpected situations, and improving the safety performance of the battery. In addition, because the specific surface area of the metal oxide is larger, the bonding force between the lower protective layer of the metal oxide material and the support layer is enhanced. Moreover, because the specific surface area of the metal oxide is larger, the lower protective layer can increase the roughness of the support layer surface, and enhance the bonding force between the conductive layer and the supporting layer, thereby increasing the overall strength of the current collector.

When the current collector is a negative current collector, copper is usually used as the material of the conductive layer, and a metal material is selected for the protective layer. More specifically, on the basis of including at least one metal protective layer, at least one of the lower protective layer and the lower protective layer further includes a metal oxide protective layer, to simultaneously improve the conductivity and interface bonding force of the negative electrode composite current collector.

[Current Collector]

FIG. 1 to FIG. 8 show schematic structural diagrams of current collectors used in electrode plates according to some implementations of this application.

The schematic diagrams of a positive current collector are shown in FIG. 1 to FIG. 4.

In FIG. 1, the positive current collector 10 includes a support layer 101 of the positive current collector and conductive layers 102 of the positive current collector disposed on two opposite surfaces of the support layer 101 of the positive current collector, and further includes protective layers 103 of the positive current collector disposed on lower surfaces of the conductive layers 102 of the positive current collector (that is, the surfaces facing the support layer 101 of the positive current collector), that is, lower protective layers.

Figure 2:
FIG. 2 is a schematic cross-sectional view of a structure of a positive current collector according to another specific implementation of this application.

In FIG. 2, the positive current collector 10 includes a support layer 101 of the positive current collector and conductive layers 102 of the positive current collector disposed on two opposite surfaces of the support layer 101 of the positive current collector, and further includes protective layers 103 of the positive current collector disposed on two opposite surfaces of the conductive layer 102 of the positive current collector, that is, a lower protective layer and an upper protective layer.

Figure 3:
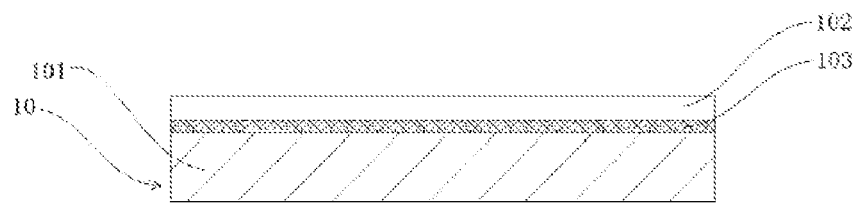
FIG. 3 is a schematic cross-sectional view of a structure of a positive current collector according to another specific implementation of this application.

In FIG. 3, the positive current collector 10 includes a support layer 101 of the positive current collector and a conductive layer 102 of the positive current collector disposed on one surface of the support layer 101 of the positive current collector, and further includes a protective layer 103 of the positive current collector disposed on a surface of the conductive layer 102 of the positive current collector facing the support layer 101 of the positive current collector, that is, a lower protective layer.

Figure 4:
FIG. 4 is a schematic cross-sectional view of a structure of a positive current collector according to another specific implementation of this application.

In FIG. 4, the positive current collector 10 includes a support layer 101 of the positive current collector and a conductive layer 102 of the positive current collector disposed on one surface of the support layer 101 of the positive current collector, and further includes protective layers 103 of the positive current collector disposed on two opposite surfaces of the conductive layer 102 of the positive current collector, that is, a lower protective layer and an upper protective layer.

Similarly, the schematic diagrams of a negative current collector are shown in FIG. 5 to FIG. 8.

Figure 5:
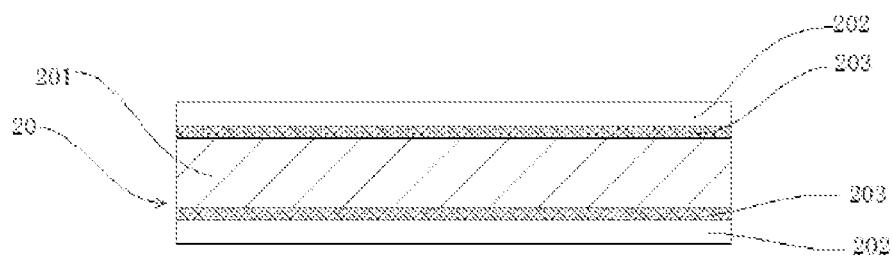
FIG. 5 is a schematic cross-sectional view of a structure of a negative current collector according to a specific implementation of this application.

In FIG. 5, the negative current collector 20 includes a support layer 201 of the negative current collector and conductive layers 202 of the negative current collector disposed on two opposite surfaces of the support layer 201 of the negative current collector, and further includes protective layers 203 of the negative current collector disposed on surfaces of the conductive layers 202 of the negative current collector facing the support layer 201 of the negative current collector, that is, lower protective layers.

Figure 6:
FIG. 6 is a schematic structural cross-sectional view of a negative current collector according to another specific implementation of this application.

In FIG. 6, the negative current collector 20 includes a support layer 201 of the negative current collector and conductive layers 202 of the negative current collector disposed on two opposite surfaces of the support layer 201 of the negative current collector, and further includes protective layers 203 of the negative current collector disposed on two opposite surfaces of the conductive layer 202 of the negative current collector, that is, a lower protective layer and an upper protective layer.

Figure 7:
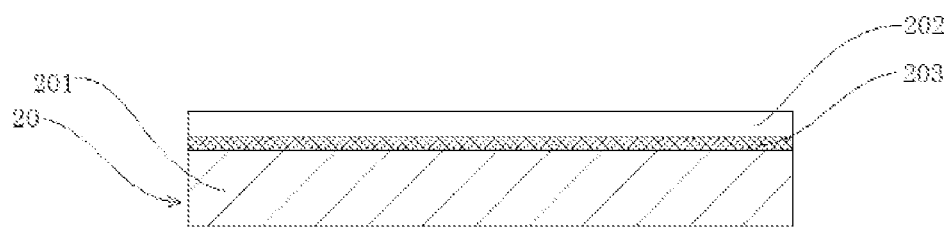
FIG. 7 is a schematic cross-sectional view of a structure of a negative current collector according to another specific implementation of this application.

In FIG. 7, the negative current collector 20 includes a support layer 201 of the negative current collector and a conductive layer 202 of the negative current collector disposed on one surface of the support layer 201 of the negative current collector, and further includes a protective layer 203 of the negative current collector disposed on the conductive layer 202 of the negative current collector facing the support layer 201 of the negative current collector, that is, a lower protective layer.

Figure 8:
FIG. 8 is a schematic cross-sectional view of a structure of a negative current collector according to another specific implementation of this application.

In FIG. 8, the negative current collector 20 includes a support layer 201 of the negative current collector and a conductive layer 202 of the negative current collector disposed on one surface of the support layer 201 of the negative current collector, and further includes protective layers 203 of the negative current collector disposed on two opposite surfaces of the conductive layer 202 of the negative current collector, that is, a lower protective layer and an upper protective layer.

The materials of the protective layers on the two opposite surfaces of the conductive layer may be the same or different, and the thickness may be the same or different.

For the current collectors used for the electrode plate according to this application, conductive layers may be disposed on two opposite surfaces of the support layer, as shown in FIG. 1, FIG. 2, FIG. 5, and FIG. 6; or a conductive layer may be disposed on only one surface of the support layer, as shown in FIG. 3, FIG. 4, FIG. 7, and FIG. 8.

In addition, although the composite current collector used for the electrode plate in this application includes the protective layer of the current collector shown in FIG. 1 to FIG. 8, it should be understood that the protective layer of the current collector is not a necessary structure of the current collector. In some implementations, the used current collector may not include the protective layer of the current collector.

[Electrode Active Material Layer of Electrode Plate]

The electrode active material layer used for the electrode plate in this application generally includes an electrode active material, a binder, and a conductive agent. The electrode active material layer may also include other optional additives or auxiliaries as needed.

An important feature of the electrode plate in this application is that a ratio of total thickness $D_{total}$ of the electrode active material layer to thickness D1 of the support layer satisfies $200 \geq D_{total}/D1 \geq 1$. Within this range, the thickness of the electrode active material layer and the thickness of the support layer are moderate, nail penetration safety performance is good, rebound of the support layer has a relatively small effect on the electrode plate, and bonding force between the composite current collector and the electrode active material layer is better. If $D_{total}/D1<1$, the battery has low energy density and is of no practical value; or if $D_{total}/D1>200$, the thickness of the support layer is relatively small, there is a risk of band breakage, the thickness of the electrode active material layer is relatively great, and dynamic performance of the battery is poor. Preferably, $D_{total}$ satisfies $100 \geq D_{total}/D1 \geq 3$, and more specifically, $50 \geq D_{total}/D1 \geq 10$.

In this application, for a technical solution of single-side coating of the electrode active material layer, $D_{total}$ is the single-side thickness D4 of the electrode active material layer; and for a technical solution of double-sided coating, $D_{total}$ is twice the single-side thickness $D_4$ of the electrode active material layer, that is, $2D_4$. In addition, if coating is performed with electrode active material layers in a multi-layered coating method, for calculation of $D_4$ and $D_{total}$, all electrode active material layers (namely, each layer) need to be counted.

In a case in which $200 \geq D_{total}/D1 \geq 1$, another important feature of the electrode plate in this application is that based on total weight of the electrode active material layer, the binder content in the electrode active material layer is not less than 1 wt %, specifically not less than 1.5 wt %, and more specifically not less than 2 wt %. For the electrode plate in this application, when the amount of binder content in the electrode active material layer is relatively high, bonding force between the active material layer and the composite current collector can be enhanced, to suppress deterioration of the bonding force between the composite current collector and the electrode active material layer that is caused by relatively great rebound of the support layer during processing, thereby ensuring that the electrode active material layer is not prone to be separated from the composite current collector. If the bonding force between the composite current collector and the electrode active material layer is insufficient, internal resistance of the battery is relatively great, polarization is increased, and electrochemical performance is relatively poor. When the bonding force is relatively strong, in unexpected situations such as nail penetration, the active material layer can efficiently wrap metal burrs generated in the conductive layer, to improve the nail penetration safety performance of the battery. When the binder content is maintained within such range, the bonding force between the active material layer and the current collector is relatively strong, and as a result, in unexpected situations such as nail penetration, the active material layer can more efficiently wrap the metal burrs generated in the conductive layer to improve the nail penetration safety performance of the battery.

For the positive electrode plate, various electrode active materials commonly used in the art (that is, positive active materials) may be selected. For example, for the lithium battery, a positive active material may be selected from lithium cobalt oxide, lithium nickel oxide, lithium manganese oxide, lithium nickel manganese oxide, lithium nickel cobalt manganese oxide, lithium nickel cobalt aluminum oxide, transition metal phosphate, lithium iron phosphate, and the like. However, this application is not limited to these materials, and may further use other conventional well-known materials that can be used as positive electrode substances of the lithium-ion battery. One type of these positive active materials may be used alone, or two or more types may be used in combination. Preferably, the positive active material may be selected from one or more of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$, and $LiMnPO_4$.

For the negative electrode plate, various electrode active materials commonly used in the art (that is, negative active materials) may be selected. For example, for lithium batteries, the negative active material may be selected from carbonaceous materials such as graphite (artificial graphite or natural graphite), conductive carbon black, and carbon fiber, metal or semi-metal materials such as Si, Sn, Ge, Bi, Sn, and In, and alloy thereof, lithium-containing nitrides or lithium-containing oxides, lithium or lithium aluminum alloy, and the like.

For the electrode plate in this application, an average particle size D50 of the active material in the electrode active material layer is 5 μm to 15 μm. If D50 is excessively small, porosity of the electrode plate after compaction is relatively small, which is not conducive to the infiltration by the electrolyte, and its relatively large specific surface area is likely to cause more side reactions with the electrolyte, reducing the reliability of the electrode assembly; or if D50 is excessively large, a great damage is likely to be caused to the conductive primer layer and the composite current collector during the compaction process of the electrode plate. D50 refers to the particle size when the cumulative volume percentage of the active material reaches 50%, that is, the median particle size of the volume distribution. D50 may be measured by using, for example, a laser diffraction particle size distribution measuring instrument (for example, Malvern Mastersizer 3000).

For example, the conductive agent in the electrode active material layer may be at least one of a conductive carbon material and a metal material. The conductive carbon material is selected from at least one of zero-dimensional conductive carbon such as acetylene black or conductive carbon black, one-dimensional conductive carbon such as carbon nano-tube, two-dimensional conductive carbon such as conductive graphite or graphene, and three-dimensional conductive carbon such as reduced graphene oxide, and the metal material is selected from at least one of aluminum powder, iron powder, and silver powder.

For example, the binder in the electrode active material layer may be selected from at least one of styrene butadiene rubber, oil-based polyvinylidene fluoride (PVDF), polyvinylidene fluoride copolymer (for example, PVDF-HFP copolymer or PVDF-TFE copolymer), sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic-acid-polyacrylonitrile copolymer, and polyacrylate-polyacrylonitrile copolymer.

It is known to persons skilled in the art, to obtain the needed electrode active material layer, the slurry formed by an electrode active material, a conductive agent, and a binder is applied onto the electrode current collector (or onto the primer layer of the electrode current collector in advance), and then post treatment such as drying is performed.

Similar to the conventional electrode plate, for the electrode plate in this application, the coated area of the entire electrode plate surface can be evenly coated with the electrode active material layer, and then a cold pressing (roll-in) operation is performed on the entire electrode plate surface. Compacted density of the electrode active material layer on the obtained electrode plate is basically identical, and there is no significant difference. As mentioned above, due to particularity of the composite current collector, this coating method may cause an edge of the electrode plate to warp up and the entire electrode plate to curve during the roll-in process, thereby reducing a yield rate of the electrode plate. Therefore, in some implementations of this application, viewed in a width direction of the coated surface of the electrode plate, based on compacted density, the electrode active material layer for coating includes 2n+1 (n=1, 2, or 3) areas, and compacted density of a middle area is greater than compacted density of areas on both sides. Because compacted density of the areas on both sides of the electrode plate is low after the process such as the cold pressing (roll-in), and compacted density of the middle area is high, that is, pressure on the areas on the both sides of the electrode plate is lower than that on the middle area in the process such as the cold pressing (roll-in), edge warping and curvature of the composite current collector and the electrode plate that are caused by the rebound of the composite current collector during the electrode plate processing may be prevented, which is conducive to formation of the electrode plate with a flat surface and electrochemical performance of the electrochemical apparatus.

In this application, the "length direction" and "width direction" of the surface of the electrode plate respectively refer to two dimensions of the surface. The length direction refers to a main dimension direction (that is, a direction with a larger magnitude), and the width direction refers to a secondary dimension direction (that is, a direction with a smaller magnitude). Generally, the length direction is consistent with a coating direction of each material layer (such as the electrode active material layer) during the electrode plate processing, and is also consistent with a winding direction of the electrode plate during a manufacturing process of the electrochemical apparatus (such as the battery); and the width direction is perpendicular to the length direction.

"The compacted density of the middle area being higher than the compacted density of the areas on the two sides" means that the compacted density of the middle area is the highest, and the compacted density of the areas on the two sides gradually decreases from the middle to the edge. Preferably, symmetrical areas on both sides have identical compacted density.

To form the 2n+1 areas of the active material layer based on the compacted density according to this application, a partition coating method may be used. That is, the surface of the electrode plate is divided into different areas (or boundaries) by using baffle plates or spacers. Each area is coated with an electrode active material slurry of different weight. In this way, after roll-in, areas of the active material layer that have different compacted density are formed. In addition, areas on both sides symmetrically have identical compacted density. Such design helps to better ensure flatness of the electrode plate.

In consideration of process complexity and a cost issue, the electrode active material layer for coating includes 3 (n=1) or 5 (n=2) areas, and most specifically 3 areas based on the compacted density.

[Conductive Primer Layer of an Electrode Plate]

In some implementations of this application, a conductive primer layer including the conductive material and a binder is also additionally disposed between the current collector and the electrode active material layer. Specifically, the conductive primer layer is disposed between the conductive layer of the current collector and the electrode active material layer. The conductive primer layer includes the conductive material and a binder, and the conductive primer layer further includes an electrode active material.

Based on total weight of the conductive primer layer, a percentage of a conductive material by weight is 10% to 99%, specifically 20% to 80%, and more specifically 50% to 80%; a percentage of the binder by weight is 1% to 90%, specifically 20% to 80%, and more specifically 20% to 50%. The percentages can help to improve the conductivity of the electrode plate and the bonding force between the current collector and the electrode active material layer.

Preferably, the conductive primer layer may further include an electrode active material. When the electrode active material is included, electrochemical capacity of the positive electrode plate can be increased.

A margin other than the conductive material and the binder may be the electrode active material. In an implementation of this application, based on total weight of the conductive primer layer, the conductive agent content is 10 wt % to 98 wt %, the binder content is 1 wt % to 89 wt %, and the electrode (positive electrode) active material content is 1 wt % to 89 wt %.

The conductive material is at least one of a conductive carbon material and a metal material. The conductive material in the conductive primer layer and the conductive agent in the active material layer may be identical or different.

The conductive carbon material is selected from at least one of zero-dimensional conductive carbon (such as acetylene black or conductive carbon black), one-dimensional conductive carbon (such as carbon nanotube), two-dimensional conductive carbon (such as conductive graphite or graphene), and three-dimensional conductive carbon (such as reduced graphene oxide). The metal material is selected from at least one of aluminum powder, iron powder, and silver powder.

A preferred conductive material includes a one-dimensional conductive carbon material or a two-dimensional conductive carbon material. After the two-dimensional conductive carbon material is added, the two-dimensional conductive carbon material in the conductive primer layer can produce "horizontal sliding" during the compacting process of the electrode plate, achieving a function of buffering, reducing the damage to the conductive layer of the current collector during the compacting process, and reducing cracks. Preferably, a particle size D50 of the two-dimensional conductive carbon material is 0.01 µm to 0.1 µm. Preferably, the two-dimensional conductive carbon material accounts for 1 wt % to 50 wt % of the conductive material. In addition, due to the special morphology of the one-dimensional conductive carbon material, the conductivity of the conductive primer layer can be improved after addition. Especially when a specific amount of the conductive material is added, compared with other types of conductive materials, the one-dimensional conductive carbon material can better improve the conductivity of the conductive primer layer. In some embodiments, carbon nanotube is used, and a length-diameter ratio of the carbon nanotube is 1000 to 5000.

In some embodiments, the conductive material is a mixed material of a zero-dimensional conductive carbon material and a one-dimensional conductive carbon material or a mixed material of a zero-dimensional conductive carbon material and a two-dimensional conductive carbon material.

The binder in the conductive primer layer and the binder in the active material layer may be identical or different.

The binder in the conductive primer layer is selected from at least one of styrene butadiene rubber, oil-based polyvinylidene fluoride (PVDF), polyvinylidene fluoride copolymer (for example, PVDF-HFP copolymer or PVDF-TFE copolymer), sodium carboxy methyl cellulose, polystyrene, polyacrylic acid, polytetrafluoroethylene, polyacrylonitrile, polyimide, aqueous PVDF, polyurethane, polyvinyl alcohol, polyacrylate, polyacrylic-acid-polyacrylonitrile copolymer, and polyacrylate-polyacrylonitrile copolymer.

The binder in the conductive primer layer is an aqueous binder, for example, at least one of aqueous PVDF, acrylic acid, polyurethane, polyvinyl alcohol, polyacrylate, polyacrylic-acid-polyacrylonitrile copolymer, and polyacrylate-polyacrylonitrile copolymer. In this way, DCR of the electrochemical apparatus does not increase significantly. In this application, an "aqueous" polymer material means that the polymer molecular chain is fully extended and dispersed in water, and an "oily" polymer material means that the polymer molecular chain is fully extended and dispersed in an oily solvent. A person skilled in the art understands that the same type of polymer materials can be dispersed in water and oil respectively by using suitable surfactants. That is, by using suitable surfactants, the same type of polymer materials can be made into aqueous polymer materials and oily polymer materials. For example, a person skilled in the art can replace PVDF with aqueous PVDF or oily PVDF as needed.

The electrode active material in the conductive primer layer and the electrode active material in the active material layer may be identical or different. Various electrode active materials commonly used in the art may be selected as the electrode active material in the conductive primer layer.

The single-side thickness H of the conductive primer layer is 0.1 µm to 5 µm. In some embodiments, H/D2 is 0.5:1 to 5:1. If the ratio is too small, the cracks of the conductive layer cannot be effectively reduced or the conductivity of the electrode plates cannot be effectively improved; or if the ratio is too large, not only the mass energy density of the battery is reduced, but also the DCR of the battery is increased, which is not conducive to improvement of the dynamic performance of the battery.

[Electrode Plate]

FIG. 9 to FIG. 16 are schematic structural diagrams of electrode plates according to some implementations of this application.

Figure 9:
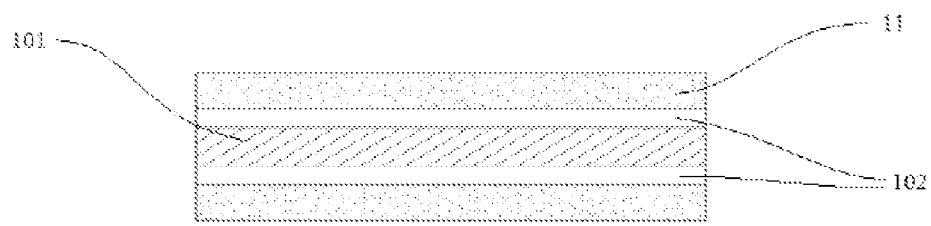
FIG. 9 is a schematic cross-sectional view of a structure of a positive electrode plate according to a specific implementation of this application.
Figure 12:
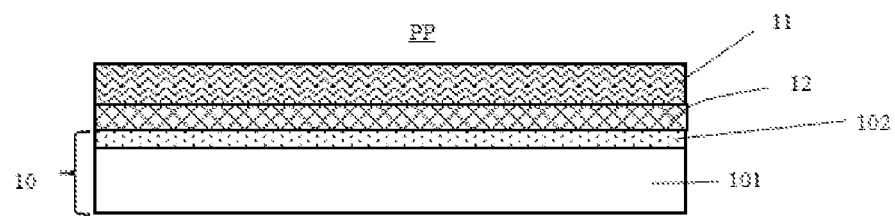
FIG. 12 is a schematic cross-sectional view of a structure of a positive electrode plate according to another specific implementation of this application.

FIG. 9 and FIG. 12 are schematic diagrams of positive electrode plates.

In FIG. 9, a positive electrode plate includes a positive current collector 10 and positive active material layers 11 that are disposed on two opposite surfaces of the positive current collector 10. The positive current collector 10 includes a positive current collector support layer 101, positive current collector conductive layers 102 that are disposed on two opposite surfaces of the positive current collector support layer 101, and a positive protective layer 103 (not shown in the figure) that is disposed on one side or two sides of the positive conductive layer 102.

Figure 10:
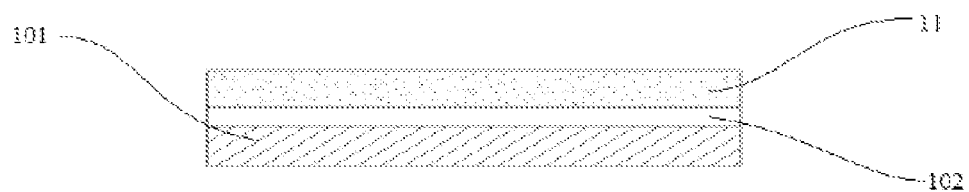
FIG. 10 is a schematic cross-sectional view of a structure of a positive electrode plate according to another specific implementation of this application.

In FIG. 10, a positive electrode plate includes a positive current collector 10 and a positive active material layer 11 that is disposed on one surface of the positive current collector 10. The positive current collector 10 includes a positive current collector support layer 101, a positive current collector conductive layer 102 that is disposed on one surface of the positive current collector support layer 101, and a positive protective layer 103 (not shown in the figure) that is disposed on one side or two sides of the positive conductive layer 102.

Figure 11:
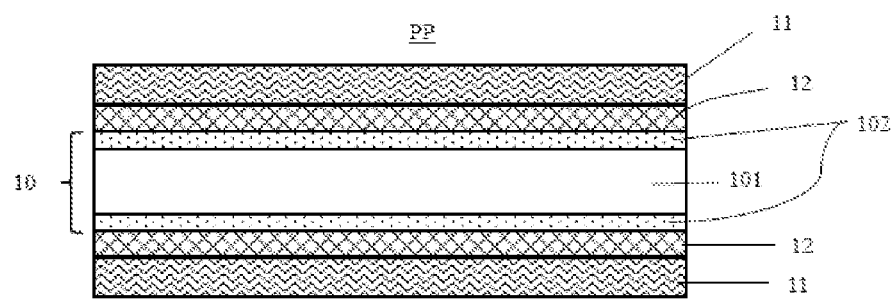
FIG. 11 is a schematic cross-sectional view of a structure of a positive electrode plate according to another specific implementation of this application.

In FIG. 11, the positive electrode plate PP includes a positive current collector 10 and a conductive primer layer 12 and a positive active material layer 11 disposed on two opposite surfaces of the positive current collector 10. The positive current collector 10 includes a positive current collector support layer 101 and positive current collector conductive layers 102 disposed on two opposite surfaces of the positive current collector support layer 101.

In FIG. 12, the positive electrode plate PP includes a positive current collector 10 and a conductive primer layer 12 and a positive active material layer 11 disposed on one surface of the positive current collector 10. The positive current collector 10 includes a positive current collector support layer 101 and a positive current collector conductive layer 102 disposed on one surface of the positive current collector support layer 101.

Figure 13:
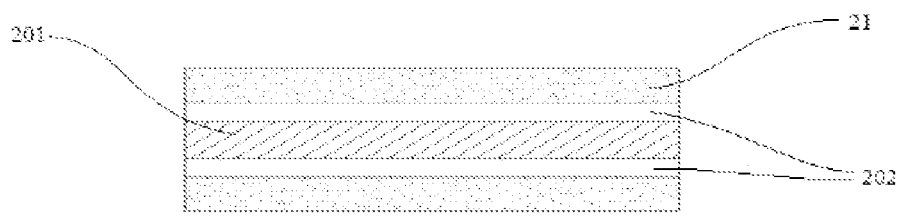
FIG. 13 is a schematic cross-sectional view of a structure of a negative electrode plate according to a specific implementation of this application.
Figure 16:
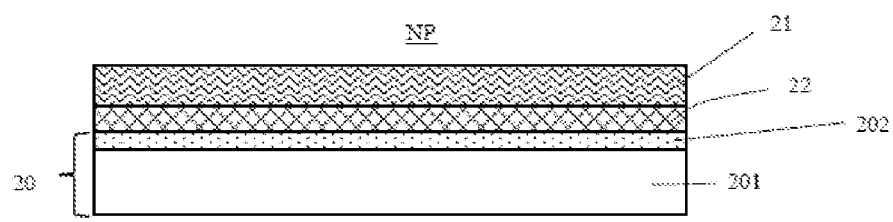
FIG. 16 is a schematic cross-sectional view of a structure of a negative electrode plate according to another specific implementation of this application.

FIG. 13 and FIG. 16 are schematic diagrams of negative electrode plates.

In FIG. 13, a negative electrode plate includes a negative current collector 20 and negative active material layers 21 that are disposed on two opposite surfaces of the negative current collector 20. The negative current collector 20 includes a negative current collector support layer 201, negative current collector conductive layers 202 that are disposed on two opposite surfaces of the negative current collector support layer 201, and a negative protective layer 203 (not shown in the figure) that is disposed on one side or two sides of the negative conductive layer 202.

Figure 14:
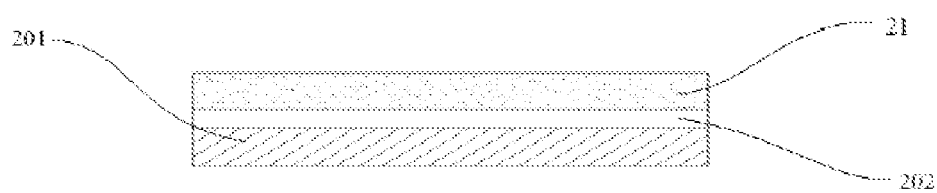
FIG. 14 is a schematic cross-sectional view of a structure of a negative electrode plate according to another specific implementation of this application.

In FIG. 14, a negative electrode plate includes a negative current collector 20 and a negative active material layer 21 that is disposed on one surface of the negative current collector 20. The negative current collector 20 includes a negative current collector support layer 201, a negative current collector conductive layer 202 that is disposed on one surface of the negative current collector support layer 201, and a negative protective layer 203 (not shown in the figure) that is disposed on one side or two sides of the negative conductive layer 202.

Figure 15:
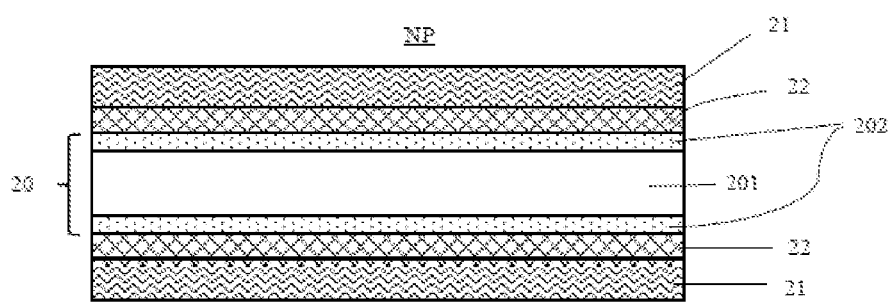
FIG. 15 is a schematic cross-sectional view of a structure of a negative electrode plate according to another specific implementation of this application.

In FIG. 15, the negative electrode plate NP includes a negative current collector 20 and conductive primer layers 22 and negative active material layers 21 disposed on two opposite surfaces of the negative current collector 20. The negative current collector 20 includes a negative current collector support layer 201 and negative current collector conductive layers 202 disposed on two opposite surfaces of the negative current collector support layer 201.

In FIG. 16, the negative electrode plate NP includes a negative current collector 20 and a conductive primer layer 22 and a negative active material layer 21 disposed on one surface of the negative current collector 20. The negative current collector 20 includes a negative current collector support layer 201 and a negative current collector conductive layer 202 disposed on one surface of the negative current collector support layer 201.

As shown in FIG. 9 to FIG. 16, the electrode active material layer may be disposed on one surface of the current collector, or may be disposed on two surfaces of the current collector.

A person skilled in the art can understand that, when a current collector provided with double-sided conductive layers is used, the electrode plate may be obtained through double-sided coating (that is, electrode active material layers are disposed on two surfaces of the current collector), or only single-side coating (that is, the electrode active material layer is only disposed on one surface of the current collector); and when the current collector provided with only a single-side conductive layer is used, the electrode plate may be obtained only through single-side coating, and the electrode active material layer (and the conductive primer layer) may only be applied on the side of the current collector provided with the conductive layer.

Figure 17:
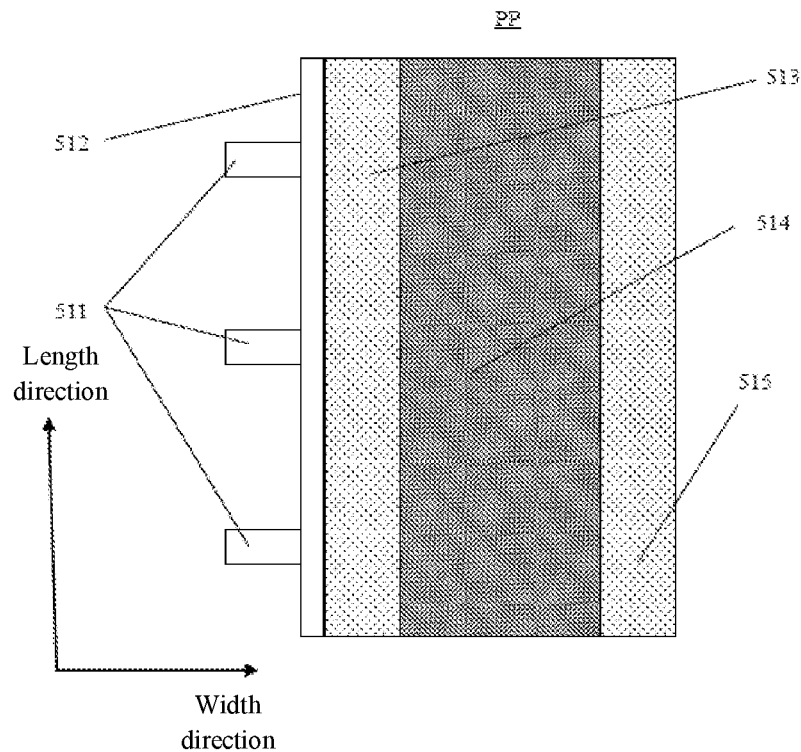
FIG. 17 is a schematic vertical view of a structure of a positive electrode plate according to a specific implementation of this application.

FIG. 17 is a schematic structural top view of an electrode plate in some implementations of this application. The positive electrode plate PP includes a body of the electrode plate and one or more tabs 511 electrically connected to the body of the electrode plate. Based on different electrode active material layers for coating, the body of the electrode plate includes four areas: a clear area 512 directly connected to the tab 511 (that is, an area that is on the surface of the current collector and that is not coated with the active material layer), a first area 513 with low compacted density, an area 514 with high compacted density, and a second area 515 with low compacted density. That is, viewed in the width direction of the coated surface of the positive electrode plate PP, the electrode active material layer includes 3 areas (that is, 2n+1 areas, where n=1) based on the compacted density. In addition, compacted density of a middle area 514 is higher than compacted density of areas 513 and 515 on the two side.

A person skilled in the art understands that the clear area on the electrode plate is disposed for processing convenience, safety, or the like, and the clear area is optional. Based on a need, the electrode plate can include 0, 1, or 2 clear areas (one clear area on each outer side of the two areas with the low compacted density).

In this application, a ratio of the middle area with the high compacted density to the total coated area (that is, a ratio of a width of the area 514 to a sum of a width of the area 513, a width of the area 514, and a width of the area 515 in this instance) may be, for example, 20 to 80%, specifically 30 to 70%, more specifically 40 to 60%, and most specifically 45 to 55%. Widths of the two areas with low compacted density may be the same or different, and specifically, are the same.

In this application, the compacted density of the area with the low compacted density may be approximately 5 to 30%, such as 7 to 25%, 8 to 20%, or 8 to 18%, lower than the compacted density of the area with the high compacted density.

[Electrochemical Apparatus]

A second aspect of this application relates to an electrochemical apparatus, including a positive electrode plate, a negative electrode plate, a separator, and an electrolyte, where the positive electrode plate and/or the negative electrode plate are/is the electrode plate according to the first aspect of this application.

The electrochemical apparatus may be a capacitor, a primary battery, or a secondary battery. For example, the electrochemical apparatus may be a lithium-ion capacitor, a lithium-ion primary battery, or a lithium-ion secondary battery. A method for constructing and preparing the electrochemical apparatus is well known, except the positive electrode plate and/or the negative electrode plate used in this application. Because the electrode plate in this application is used, the electrochemical apparatus has improved safety (for example, nail penetration safety) and electrical performance. In addition, because the electrode plate in this application can be easily processed, manufacturing costs of the electrochemical apparatus using the electrode plate in this application can be reduced.

In the electrochemical apparatus in this application, specific types and composition of the separator and the electrolyte are not specifically limited, and may be selected based on an actual requirement. Specifically, the separator may be selected from a polyethylene film, a polypropylene film, a polyvinylidene fluoride film, non-woven fabrics, and a multilayer composite film thereof. When the battery is a lithium-ion battery, a non-aqueous electrolyte is generally used as the electrolyte. As the non-aqueous electrolyte, a lithium salt solution dissolved in an organic solvent is generally used. For example, lithium salt is inorganic lithium salt such as $LiClO_4$, $LiPF_6$, $LiBF_4$, $LiAsF_6$, or $LiSbF_6$, or organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$, or $LiC_nF_{2n+1}SO_3$ (n≥2). The organic solvents used in the non-aqueous electrolyte are, for example, cyclic carbonate such as vinyl carbonate, propylene carbonate, butene carbonate, and vinylene carbonate, chain carbonate such as dimethyl carbonate, diethyl carbonate, and methyl ethyl carbonate, chain ester such as methyl propionate, cyclic ester such as γ-butyrolactone, chain ether such as dimethoxyethane, diethyl ether, diethylene glycol dimethyl ether, and triethylene glycol dimethyl ether, cyclic ether such as tetrahydrofuran and 2-methyltetrahydrofuran, nitrile such as acetonitrile and propionitrile, or a mixture of these solvents.

In some embodiments, the electrochemical apparatus may include an outer package for encapsulating the positive electrode plate, the negative electrode plate, and an electrolyte. In an example, the positive electrode plate, the negative electrode plate, and the separator may be laminated or wound to form an electrode assembly of a laminated structure or an electrode assembly of a wound structure, and the electrode assembly is encapsulated in an outer package. The electrolyte may be an electrolyte solution, and the electrolyte solution infiltrates into the electrode assembly. There may be one or more electrode assemblies in the electrochemical apparatus, and a quantity of the electrode assemblies may be adjusted as required.

In some embodiments, the outer package of the electrochemical apparatus may be a soft package, for example, a soft bag. A material of the soft package may be plastic, for example, may include one or more of polypropylene PP, polybutylene terephthalate PBT, polybutylene succinate PBS, and the like. Alternatively, the outer package of the electrochemical apparatus may be a hard shell, for example, an aluminum shell.

Figure 18:
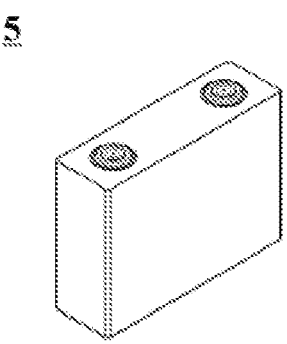
FIG. 18 is a schematic diagram of an implementation of an electrochemical apparatus according to this application.

This application sets no particular limitation on a shape of the electrochemical apparatus, and the electrochemical apparatus may have a cylindrical, square, or any other shape. FIG. 18 shows an electrochemical apparatus 5 of a square structure used as an example.

In some embodiments, electrochemical apparatuses may be assembled into a battery module, and the battery module may include a plurality of electrochemical apparatuses. A specific quantity may be adjusted based on application and capacity of the battery module.

Figure 19:
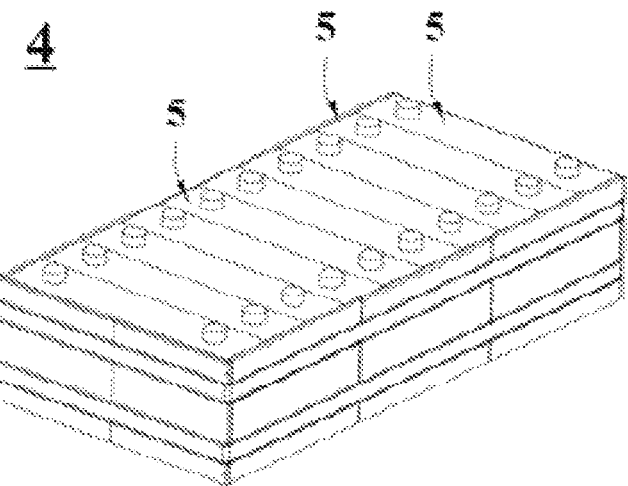
FIG. 19 is a schematic diagram of an implementation of a battery module according to this application.

FIG. 19 shows a battery module 4 used as an example. Referring to FIG. 19, in a battery module 4, a plurality of electrochemical apparatuses 5 may be arranged in sequence in a length direction of the battery module 4. Certainly, the apparatuses may be arranged in any other manner. Further, the plurality of electrochemical apparatuses 5 may be fastened by using fasteners.

Optionally, the battery module 4 may further include a housing with accommodating space, and the plurality of electrochemical apparatuses 5 are accommodated in the accommodating space.

In some embodiments, battery modules may be further assembled into a battery pack, and a quantity of battery modules included in the battery pack may be adjusted based on application and capacity of the battery pack.

Figure 20:
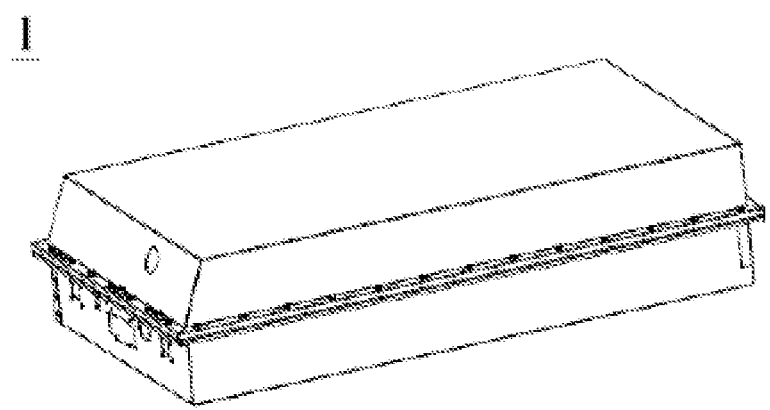
FIG. 20 is a schematic diagram of an implementation of a battery pack according to this application.
Figure 21:
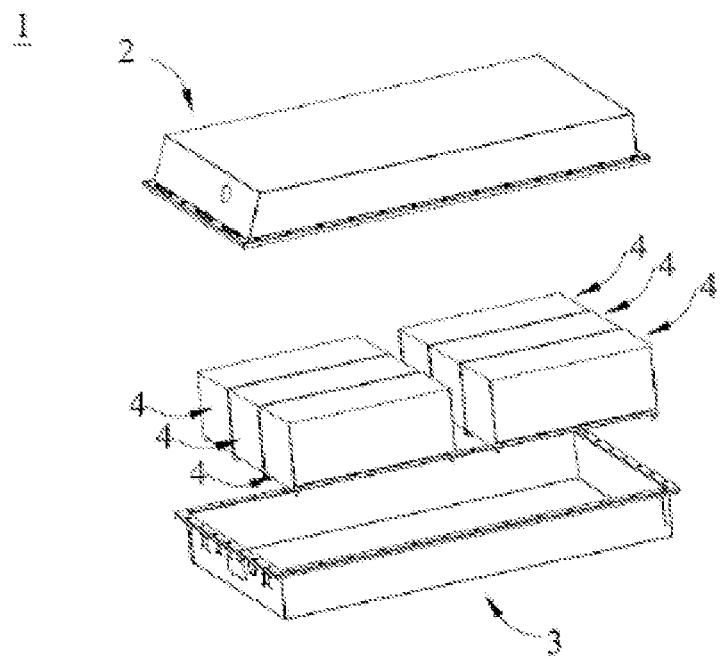
FIG. 21 is an exploded diagram of FIG. 20.

FIG. 20 and FIG. 21 show a battery pack 1 used as an example. Referring to FIG. 20 and FIG. 21, the battery pack 1 may include a battery box and a plurality of battery modules 4 disposed in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

[Apparatus]

A third aspect of this application relates to an apparatus, including the electrochemical apparatus according to the second aspect of this application. The electrochemical apparatus may be used as a power source for the apparatus, or an energy storage unit of the apparatus. The apparatus includes, but is not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

The electrochemical apparatus, a battery module, or a battery pack may be selected for the apparatus according to use requirements for the apparatus.

Figure 22:
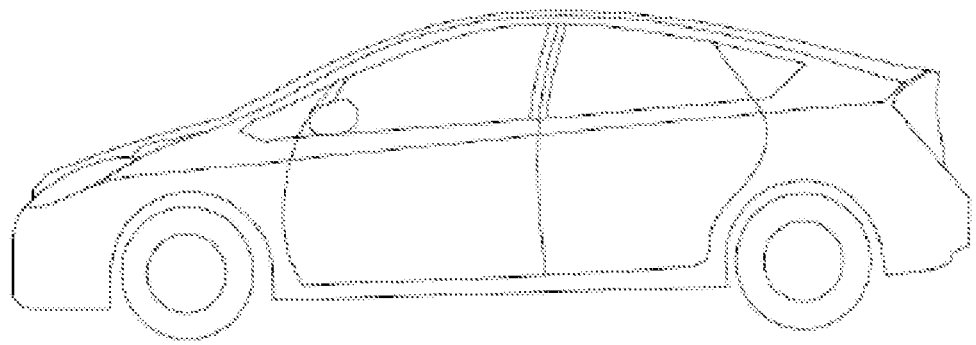
FIG. 22 is a schematic diagram of an implementation of an apparatus using an electrochemical apparatus as a power source according to this application.

FIG. 22 shows an apparatus used as an example. The apparatus is a full electric vehicle, a hybrid electric vehicle, a plug-in hybrid electric vehicle, or the like. To meet a requirement of the apparatus for high power and high energy density of the electrochemical apparatus, a battery pack or a battery module may be used.

In another example, the apparatus may be a mobile phone, a tablet computer, a notebook computer, or the like. The apparatus usually requires lightness and thinness, and the electrochemical apparatus may be used as a power source.

A person skilled in the art may understand that the foregoing definitions or specific ranges of component selection, component content, and material physicochemical performance parameters in the electrode plate, electrode active material layers, and the like in different implementations of this application may be randomly combined, and various implementations obtained through the combination shall still fall within the scope of this application and shall be considered as a part of content disclosed in this specification.

Unless otherwise specified, various parameters referred to in this specification have their common meaning known in the art, and can be measured in methods known in the art. For example, a test may be conducted in a method provided in an embodiment of this application. In addition, specific ranges and options of different parameters provided in various implementations may be randomly combined, and it is considered that various combinations obtained shall fall within the scope of the present disclosure of this application.

The following further describes beneficial effects of this application with reference to embodiment examples.

Embodiment Examples

I) Preparation of a Current Collector

Current collectors used in the electrode plates in embodiment examples and comparative examples were prepared as follows:

1. Preparation of a Current Collector without a Protective Layer:

A support layer of specific thickness was selected, and a conductive layer of specific thickness was formed on a surface of the support layer through vacuum evaporating, mechanical roll-in, or bonding.

Where,
(1) Formation by the vacuum evaporating: A support layer on which surface cleaning processing had been performed was placed in a vacuum plating chamber. A high-purity metal wire in a metal evaporating chamber was melted and evaporated at high temperature of 1600° C. to 2000° C. The evaporated metal passed through a cooling system in the vacuum plating chamber and was finally deposited on a surface of the support layer to form a conductive layer.
(2) Formation by the mechanical roll-in method: The foil of the conductive layer material was placed in a mechanical roller, and compacted to predetermined thickness through rolling by applying pressure of 20 t to 40 t, and then placed onto the surface of the support layer on which a surface cleaning treatment had been performed. Finally, the two were placed in the mechanical roller to be tightly bonded by applying pressure of 30 t to 50 t.
(3) Formation by the bonding method: The foil of the conductive layer material was placed in a mechanical roller, and compacted to predetermined thickness through rolling by applying pressure of 20 t to 40 t, and then the surface of the support layer that a surface cleaning treatment had been performed was coated with a mixed solution of PVDF and NMP. Finally, the conductive layer of the predetermined thickness was adhered to the surface of the support layer, and dried at 100° C.

2. Preparation of a Current Collector with a Protective Layer:

The current collector with the protective layer may be prepared in the following manners:
(1) First, a protective layer was disposed on a surface of the support layer in a vapor deposition method or a coating method, and then a conductive layer of specific thickness was formed on the surface of the support layer with the protective layer through vacuum evaporating, mechanical roll-in, or bonding to prepare a current collector with a protective layer (the protective layer located between the support layer and the conductive layer). In addition, on the basis of the above, another protective layer was formed on the surface of the conductive layer away from the support layer in a vapor deposition method, an in-situ formation method, or a coating method to prepare a current collector with protective layers (the protective layers located on two opposite surfaces of the conductive layer).
(2) First, a protective layer was formed on one surface of the conductive layer in a vapor deposition method, an in-situ formation method, or a coating method, and then the above conductive layer with the protective layer was disposed on the surface of the support layer through mechanical roll-in or bonding, with the protective layer located between the support layer and the conductive layer, to prepare a current collector with a protective layer (the protective layer located between the support layer and the conductive layer). In addition, on the basis of the above, another protective layer was formed on the surface of the conductive layer away from the support layer in a vapor deposition method, an in-situ formation method, or a coating method to prepare a current collector with protective layers (the protective layers located on two opposite surfaces of the conductive layer).
(3) First, a protective layer was formed on one surface of the conductive layer in a vapor deposition method, an in-situ formation method, or a coating method, and then the above conductive layer with the protective layer was disposed on the surface of the support layer through mechanical roll-in or bonding, with the protective layer located on the surface of the support layer away from the conductive layer, to prepare a current collector with a protective layer (the protective layer located on the surface of the support layer away from the conductive layer).
(4) First, protective layers were formed on two surfaces of the conductive layer in a vapor deposition method, an in-situ formation method, or a coating method, and then the above conductive layer with the protective layers was disposed on the surface of the support layer through mechanical roll-in or bonding to prepare a current collector with protective layers (the protective layers located on two opposite surfaces of the conductive layer).
(5) On the basis of the above "Preparation of a current collector without a protective layer", another protective layer was formed on the surface of the conductive layer away from the support layer in a vapor deposition method, an in-situ formation method, or a coating method to prepare a current collector with a protective layer (the protective layer located on the surface of the support layer away from the conductive layer).

In the preparation instance, for the vapor deposition method, a vacuum evaporating method was used; for the in-situ formation method, an in-situ passivation method was used; and for the coating method, a doctor blade coating method was used.

Formation by the vacuum evaporating: A sample on which surface cleaning processing had performed was placed in a vacuum plating chamber. A protective layer material in an evaporating chamber was melted and evaporated at high temperature of 1600° C. to 2000° C. The evaporated protective layer material passed through a cooling system in the vacuum plating chamber and was finally deposited on a surface of the sample to form a protective layer.

Formation by the in-situ passivation: A conductive layer was placed in a high-temperature oxidizing environment, where a temperature was controlled to be 160° C. to 250° C., oxygen supplying in the high-temperature environment was maintained, and processing time is 30 min, so that a metal oxide protective layer was formed.

Formation by the gravure coating: A protective layer material and NMP were stirred and mixed; then a sample surface was coated with a slurry of the protective layer material (solid content was 20% to 75%). Coating thickness was then controlled by using a gravure roller. Finally, the coating was dried at temperature of 100° C. to 130° C.

II) Impact of Area Distribution of an Electrode Active Material Layer on Flatness of an Electrode Plate The following describes impact of different coating methods of the electrode active material layer on the flatness of the electrode plate in the implementations of this application. In this application, the following three different types of positive electrode plates and negative electrode plates were respectively compared in terms of flatness.

1) Positive Electrode Plate Coated Through Partition

The used composite current collector had two surfaces of 10 μm PET on which an Al layer of thickness of 1 μm was vapor-deposited.

92 wt % of the positive active material NCM333, 5 wt % of the conductive agent Super-P ("SP" for short), and 3 wt % of PVDF were mixed with NMP used as a solvent, and stirred well to prepare a positive active material layer slurry.

Partition coating was performed on two surfaces of the composite current collector through extrusion coating. That is, a middle area was an area with high coating weight, and areas on two sides were areas with low coating weight (which can be implemented by extruding a spacer or a baffle plate), and drying was performed at 85° C. A width of the area with the high coating weight was 4 cm, and both widths of the areas with the low coating weight were 2.1 cm.

Then cold-pressing and cutting were performed, and drying was performed for four hours in an 85° C. vacuum condition, and a tab was welded, thereby obtaining a positive electrode plate.

Compacted density of the area with the high coating weight was 3.45 g/cm$^3$, and compacted density of both the areas with the low coating weight was 3.3 g/cm$^3$.

A compacted density testing method: 30 wafers with areas of S were first cut from the current collector, and weight and thickness of the 30 wafers were measured. Average weight $m_1$ and an average height $H^1$ were calculated. 30 wafers with areas of S were then cut from the electrode plate, and average weight $m_2$ and an average height $H_2$ were calculated. In this way:

Compaction density=$(m_2-m_1)/((H_2-H_1)*S)$.

2) Evenly-Coated Comparative Positive Electrode Plate:

The foregoing composite current collector with Al-coated PET of thickness of 10 μm was also used as the current collector, and was prepared in a method similar to the preparation method of the foregoing positive electrode plate. However, the positive active material layer slurry was directly evenly applied on two surfaces of the composite current collector. That is, no partitioning treatment was performed. Then, a post treatment was performed to obtain an evenly-coated comparative positive electrode plate. Compacted density of the positive active material layer was 3.4 g/cm$^3$.

3) Conventional Positive Electrode Plate

The current collector was an Al foil of thickness of 12 μm. Similar to that in the preparation method of the above comparative positive electrode plate, the positive active material layer slurry was evenly directly applied on the two surfaces of the current collector of the Al foil, and then the conventional positive electrode plate was obtained through post-treatment.

4) Negative Electrode Plate Coated Through Partition

The used composite current collector had two surfaces of 10 μm PET on which a Cu layer of thickness of 1 μm was vapor-deposited.

A negative active substance artificial graphite, a conductive agent Super-P, a thickening agent CMC, and a binder SBR were added based on a mass ratio of 96.5:1.0:1.0:1.5 to a deionized water solvent, and mixed well to prepare a negative active material layer slurry.

Partition coating was performed on the two surfaces of the composite current collector through extrusion coating. That is, a middle area was an area with high coating weight, and areas on two sides were areas with low coating weight (which can be implemented by extruding a spacer or a baffle plate), and drying was performed at 85° C. to obtain the negative active material layer. A width of the area with the high coating weight was 4.5 cm, and both widths of the areas with the low coating weight were 2 cm.

Then the current collector having various coating layers was cold-pressed and cut, and dried for four hours in a 110° C. vacuum condition, and a tab was welded, thereby obtaining a negative electrode plate.

Compacted density of the area with the high coating weight was 1.7 g/cm$^3$, and compacted density of both the areas with the low coating weight was 1.6 g/cm3.

5) Evenly-Coated Comparative Negative Electrode Plate:

The foregoing composite current collector with Cu-coated PET of thickness of 10 μm was also used as the current collector, and was prepared in a method similar to the preparation method of the foregoing negative electrode plate. However, the negative active material layer slurry was directly evenly applied on two surfaces of the composite current collector. That is, no partitioning treatment was performed. Then, a post treatment was performed to obtain an evenly-coated comparative negative electrode plate. Compacted density of the negative active material layer was 1.65 g/cm$^3$.

6) Conventional Negative Electrode Plate:

The current collector was Cu foil of thickness of 8 μm. Similar to that in the preparation method of the foregoing comparative negative electrode plate that was evenly coated, the negative active material layer slurry was directly evenly applied on the surface of the current collector of the Cu foil, and then the conventional negative electrode plate was obtained through post-treatment.

Flatness of the foregoing six different electrode plates was measured. A flatness test of the electrode plate was conducted by measuring an arc height of the electrode plate relative to a reference plane. The arc height was measured specifically as follows:

An electrode plate sample of a length of 2 m was taken, placed on the reference plane and expanded in a width direction of the plane, where the width of the plane was slightly less than a length of the electrode plate sample. Heavy objects with equal weight (1 Kg) were then placed on both sides of the sample, so that the sample attached to the plane. Then a soft ruler was used to measure a height of a middle area of the sample above the plane, and the height above the plane was the arc height. During actual production, the electrode plate with an arc height less than or equal to 2 mm was usually considered to be flat, and the positive electrode plate and the negative electrode plate can be accurately aligned when assembled into a battery.

The following table shows specific measurement results:

| Electrode plate | Arc height |
|---|---|
| Positive electrode plate coated through partition | Less than 2 mm |
| Evenly coated comparative positive electrode plate | Greater than 5 mm |
| Conventional positive electrode plate | Less than 2 mm |
| Negative electrode plate coated through partition | Less than 2 mm |
| Evenly-coated comparative negative electrode plate: | Greater than 5 mm |
| Conventional negative electrode plate | Less than 2 mm |

It may be learned from the measurement results in the foregoing table that, the conventional positive electrode plate or negative electrode plate using a metal current collector met a requirement for flatness of the electrode plate (the arc height was less than or equal to 2 mm), which can implement accurate alignment during battery assembly. However, if the composite current collector was evenly coated according to the conventional process, the arc height of the electrode plate was relatively great (greater than 5 mm), the flatness of the electrode plate was not desirable, which made it difficult to implement accurate alignment during battery assembly. However, after the partition coating process in this application was used, the arc height was significantly reduced, which is similar to that of the conventional electrode plate, thereby implementing accurate alignment during battery assembly. It can be learned that the special design of the partition coating of the active material layer can help eliminate or reduce possible edge warping and curvature of the electrode plate including the composite current collector after roll-in, flatness of the electrode plate is improved, and accurate alignment was implemented during battery assembly. In addition, the battery can also have excellent electrochemical performance and safety performance brought by the composite current collector.

III) Effect of Other Factors Such as a Structure and Composition of an Electrode Plate on Improvement of Electrochemical Performance of a Battery The following describes the impact of the structure and composition of the electrode plates (such as the composition of the current collector, existence of a conductive primer layer, thickness and composition of the electrode active material layer) on battery performance.

It should be noted that in the following embodiment examples in which the composite current collector was used to prepare the electrode plate, a partition coating method of the active material layer was used to ensure final flatness of the electrode plate and accuracy of an electrochemical performance measurement result. However, a person skilled in the art can understand that the partition coating of the active material layer was not the only method to implement an even electrode plate, and the person skilled in the art can also implement the even electrode plate in another alternative method.

1. Preparation of an Electrode Plate:
1) Positive Electrode Plate without a Conductive Primer Layer:

92 wt % of the positive active material (if no specific material was specified, NCM333 was used by default), 5 wt % of the conductive agent Super-P ("SP" for short), and 3 wt % of PVDF were mixed with NMP used as a solvent, and stirred well to prepare a positive active material layer slurry (composition of the active material layer slurry in some embodiments may vary, and in this case, specified composition in the embodiments shall prevail). Extrusion coating was performed to apply, through partition coating, the positive active material layer slurry on two surfaces of the composite current collector prepared in the foregoing method, and drying was performed at 85° C. to obtain a positive active material layer.

Then the current collector having various coating layers was cold-pressed and cut, and dried for four hours in an 85° C. vacuum condition, and a tab was welded, thereby obtaining a positive electrode plate.

2) Conventional Positive Electrode Plate:

The current collector was Al foil of thickness of 12 μm. Similar to that in the preparation method of the foregoing positive electrode plate, the positive active material layer slurry was directly applied on the surface of the current collector of the Al foil, and then the conventional positive electrode plate was obtained through post-treatment.

3) Positive Electrode Plate with a Conductive Primer Layer:

A specific proportion of a conductive material (such as conductive carbon black), a binder (such as PVDF or polyacrylic acid), and an optional active material were dissolved in an appropriate solvent (such as NMP or water), and stirred well to form a primer slurry.

Two surfaces of the composite current collector were evenly coated with the primer slurry at a coating speed of 20 m/min, and a primer layer was dried, where oven temperature was 70° C. to 100° C., and drying time was 5 min.

After the primer layer was completely dried, 92 wt % of the positive active material, 5 wt % of the conductive agent Super-P ("SP" for short), and 3 wt % of PVDF were mixed with NMP as a solvent, and stirred well to prepare a positive active material layer slurry. Extrusion coating was performed to apply the positive active material layer slurry on the surface of the primer layer through partition coating, and drying was performed at 85° C. to obtain the positive active material layer. Then a positive electrode plate with the conductive primer layer was obtained after a post treatment.

4) Negative Electrode Plate without a Conductive Primer Layer:

Negative active substance artificial graphite, conductive agent Super-P, a thickening agent CMC, and a binder SBR were added to a deionized water solvent at a mass ratio of 96.5:1.0:1.0:1.5, and well mixed to prepare a negative active material layer slurry. Extrusion coating was performed to apply, through partition coating, the negative active material layer slurry on two surfaces of the composite current collector prepared in the foregoing method, and drying was performed at 85° C. to obtain a negative active material layer.

Then the current collector having various coating layers was cold-pressed and cut, and dried for four hours in a 110° C. vacuum condition, and a tab was welded, thereby obtaining a negative electrode plate.

5) Conventional Negative Electrode Plate:

The current collector was a Cu foil of thickness of 8 μm. Similar to that in the preparation method of the above negative electrode plate, the negative active material layer slurry was directly applied on the surface of the current collector of the Cu foil, and then the conventional negative electrode plate was obtained through post-treatment.

6) Negative Electrode Plate with a Conductive Primer Layer:

A specific proportion of a conductive material (such as conductive carbon black), a binder (such as PVDF or polyacrylic acid), and an optional active material were dissolved in an appropriate solvent (such as NMP or water), and stirred well to form a primer slurry.

The two surfaces of the composite current collector prepared according to the foregoing method were evenly coated with the primer slurry at a coating speed of 20 m/min, and a primer layer was dried, where oven temperature was 70° C. to 100° C., and drying time was 5 min.

After the primer layer was completely dried, negative active substance artificial graphite, a conductive agent Super-P, a thickening agent CMC, and a binder SBR were added to the deionized water solvent at a mass ratio of 96.5:1.0:1.0:1.5, and well mixed to prepare a negative active material layer slurry. Extrusion coating was performed to apply, through partition coating, the negative active material layer slurry on the surface of the primer layer, and drying was performed at 85° C. to obtain the negative active material layer. Then the negative electrode plate with a conductive primer layer was obtained through post-treatment.

In a preparation process of the foregoing electrode plate, for the composite current collector, to obtain the even electrode plate, the active material slurry was applied in the partition coating method in this application. For specific parameter settings of the partition coating, such as a width, compacted density, and the like of each area, settings similar to those described in the previous sections of "Positive electrode plate coated through partition" and "Negative electrode plate coated through partition" were used.

2. Preparation of a Battery

Through a common battery manufacturing process, a positive electrode plate (compacted density: 3.4 g/cm$^3$), a PP/PE/PP separator, and a negative electrode plate (compacted density: 1.6 g/cm$^3$) were wound together to form a bare electrode assembly, then the bare battery assembly was placed into a battery housing, the electrolyte (an EC to EMC volume ratio was 3:7, and LiPF$_6$ was 1 mol/L) was injected, and then sealing, formation, and other processes were performed to finally obtain a lithium-ion battery (hereinafter referred to as the battery).

3. Battery Testing Method:

1) Lithium-Ion Battery Cycle Life Testing Methods:

Method 1: The lithium-ion battery was charged and discharged at 45° C. That is, the lithium-ion battery was charged to 4.2 V with a current of 1 C, and then discharged to 2.8 V with a current of 1 C, and the discharge capacity during a first cycle was recorded. 1000 cycles of 1 C/1 C charge and discharge were then performed on the battery, and the battery discharge capacity during a 1000$^{th}$ cycle was recorded. The discharge capacity during the 1000$^{th}$ cycle was divided by the discharge capacity during the first cycle to obtain the capacity retention rate during the 1000$^{th}$ cycle.

Method 2: The lithium-ion battery was charged and discharged at 45° C. That is, the lithium-ion battery was charged to 4.2 V with a current of 0.3 C, and then discharged to 2.8 V with a current of 0.3 C, and the discharge capacity during a first cycle was recorded. 1000 cycles of 0.3 C/0.3 C charge and discharge were then performed on the battery, and the battery discharge capacity during a 1000$^{th}$ cycle was recorded. The discharge capacity during the 1000$^{th}$ cycle was divided by the discharge capacity during the first cycle to obtain the capacity retention rate during the 1000$^{th}$ cycle.

2) DCR Growth Rate Testing Method:

At 25° C., the battery was adjusted to 50% SOC with a current of 1 C, and a voltage U1 was recorded. Then the battery was discharged with a current of 4 C for 30 seconds, and a voltage U2 was recorded. DCR=(U1−U2)/4 C. Then, 500 cycles of 1 C/1 C charge and discharge were performed on the battery, and the DCR during a 500$^{th}$ cycle was recorded. The DCR during the 500$^{th}$ cycle was divided by the DCR during the first cycle and subtracted by 1 to obtain a DCR growth rate during the 500$^{th}$ cycle.

3) Needle Penetration Test:

The batteries (10 samples) were fully charged to the cut-off voltage with a current of 1 C, and then charged at a constant voltage until the current drops to 0.05 C, and then the charging stopped. A φ8 mm heat-resistant steel needle was used to penetrate at a speed of 25 mm/s in a direction perpendicular to the electrode plate of the battery, and the position at which the penetration was performed was close to a geometric center of a surface to be punctured. The battery was observed for any possible burn or explosion while the steel needle remained in the battery.

4. Test Result and Discussion:

4.1 Effect of a Composite Current Collector on Improvement of Mass Energy Density of a Battery Specific parameters of the current collector and the electrode plate in the embodiment examples are shown in Table 1 (no current collector in the embodiment examples that is listed in Table 1 is provided with a protective layer). In Table 1, for the positive current collector, the percentage of the current collector by weight refers to the weight of the positive current collector per unit area divided by the weight of the conventional positive current collector per unit area. For the negative current collector, the percentage of the current collector by weight refers to the weight of the negative current collector per unit area divided by the weight of the conventional negative current collector per unit area.

TABLE 1

| Electrode plate number | Current collector number | Support layer Material | D1 | Conductive layer Material | D2 | Current collector Thickness | Percentage of the current collector by weight |
|---|---|---|---|---|---|---|---|
| Positive electrode plate 1 | Positive current collector 1 | PI | 6 µm | Al | 300 nm | 6.6 µm | 30.0% |
| Positive electrode plate 2 | Positive current collector 2 | PET | 4 µm | Al | 500 nm | 5 µm | 24.3% |
| Positive electrode plate 3 | Positive current collector 3 | PET | 2 µm | Al | 200 nm | 2.4 µm | 11.3% |
| Positive electrode plate 4 | Positive current collector 4 | PET | 10 µm | Al | 1 µm | 12 µm | 56.5% |
| Positive electrode | Positive current collector | PET | 10 µm | Al | 1.5 µm | 13 µm | 65% |

TABLE 1-continued

| Electrode plate number | Current collector number | Support layer Material | D1 | Conductive layer Material | D2 | Current collector Thickness | Percentage of the current collector by weight |
|---|---|---|---|---|---|---|---|
| plate 5 | 5 | | | | | | |
| Positive electrode plate 6 | Positive current collector 6 | PET | 10 μm | Al | 2 μm | 14 μm | 73.5% |
| Conventional positive electrode plate | Conventional positive current collector | / | / | Al | / | 12 μm | 100% |
| Negative electrode plate 1 | Negative current collector 1 | PET | 5 μm | Cu | 500 nm | 6 μm | 21.6% |
| Negative electrode plate 2 | Negative current collector 2 | PI | 2 μm | Cu | 800 nm | 3.6 μm | 23.8% |
| Negative electrode plate 3 | Negative current collector 3 | PET | 8 μm | Cu | 1 μm | 10 μm | 39.6% |
| Negative electrode plate 4 | Negative current collector 4 | PET | 6 μm | Cu | 1.5 μm | 9 μm | 48.5% |
| Negative electrode plate 5 | Negative current collector 5 | PET | 4 μm | Cu | 1.2 μm | 6.4 μm | 37.3% |
| Negative electrode plate 6 | Negative current collector 6 | PET | 10 μm | Cu | 200 nm | 10.4 μm | 23.3% |
| Negative electrode plate 7 | Negative current collector 7 | PI | 8 μm | Cu | 2 μm | 12 μm | 65.3% |
| Conventional negative electrode plate | Conventional negative current collector | / | / | Cu | / | 8 μm | 100% |

It may be learned from Table 1 that, compared with the conventional current collector, weight of the composite positive current collector and the composite negative current collector according to this application were reduced to some degree, thereby improving the mass energy density of the battery. However, when the thickness of the conductive layer was greater than 1.5 μm, the weight reduction degree of the current collector becomes smaller, especially for the negative current collector.

4.2 Effect of a Protective Layer on Improvement of Electrochemical Properties of a Composite Current Collector On the basis of the current collector of each embodiment example listed in Table 1, a protective layer was further formed to investigate the effect of a protective layer on improvement of the electrochemical properties of the composite current collector. The "positive current collector 2-1" in Table 2 means a current collector obtained by forming a protective layer on the basis of the "positive current collector 2" in Table 1. Numbers of other current collectors have similar meanings.

TABLE 2

| Electrode plate number | Current collector number | Upper protective layer Material | D3' | Lower protective layer Material | D3" |
|---|---|---|---|---|---|
| Positive electrode plate 2-1 | Positive current collector 2-1 | Nickel oxide | 10 nm | Nickel oxide | 8 nm |
| Positive electrode plate 2-2 | Positive current collector 2-2 | Nickel oxide | 50 nm | Nickel oxide | 30 nm |
| Negative electrode plate 4-1 | Negative current collector 4-1 | / | / | Nickel | 200 nm |
| Negative electrode plate 4-2 | Negative current collector 4-2 | Nickel | 5 nm | / | / |
| Negative electrode plate 4-3 | Negative current collector 4-3 | Nickel-based alloy | 100 nm | / | / |
| Negative electrode plate 4-4 | Negative current collector 4-4 | Nickel | 10 nm | Nickel | 10 nm |
| Negative electrode plate 4-5 | Negative current collector 4-5 | Nickel | 50 nm | Nickel | 50 nm |
| Negative electrode plate 4-6 | Negative current collector 4-6 | Nickel | 100 nm | Nickel | 50 nm |

Table 3 shows cyclic performance data measured after batteries were assembled by using the electrode plates (without a conductive primer layer) listed in Table 2.

TABLE 3

| Battery number | Electrode plate | | Capacity retention rate after the 1000$^{th}$ cycle at 45° C. (method 1) |
|---|---|---|---|
| Battery 1 | Conventional negative electrode plate | Conventional positive electrode plate | 86.5% |
| Battery 2 | Conventional negative electrode plate | Positive electrode plate 2 | 80.7% |
| Battery 3 | Conventional negative electrode plate | Positive electrode plate 2-1 | 85.2% |
| Battery 4 | Conventional negative electrode plate | Positive electrode plate 2-2 | 85.4% |
| Battery 5 | Negative electrode plate 4 | Conventional positive electrode plate | 86.3% |
| Battery 6 | Negative electrode plate 4-1 | Conventional positive electrode plate | 87.1% |

TABLE 3-continued

| Battery number | Electrode plate | | Capacity retention rate after the 1000$^{th}$ cycle at 45° C. (method 1) |
|---|---|---|---|
| Battery 7 | Negative electrode plate 4-2 | Conventional positive electrode plate | 86.5% |
| Battery 8 | Negative electrode plate 4-3 | Conventional positive electrode plate | 86.7% |
| Battery 9 | Negative electrode plate 4-4 | Conventional positive electrode plate | 87.6% |
| Battery 10 | Negative electrode plate 4-5 | Conventional positive electrode plate | 87.8% |
| Battery 11 | Negative electrode plate 4-6 | Conventional positive electrode plate | 88.0% |

As shown in Table 3, compared with the battery 1 using the conventional positive electrode plate and the conventional negative electrode plate, the battery using the composite current collector had better cycle life and had cycle performance equivalent to that of the conventional battery. Especially for a battery manufactured by using a current collector with a protective layer, compared with a battery manufactured by using a current collector without a protective layer, a capacity retention rate of the battery can be further improved, which indicates that the battery is more reliable.

4.3 Effect of a Composite Current Collector on Improvement of Nail Penetration Safety of a Battery The following describes the effect of the composite current collector on the improvement of the nail penetration safety of the battery by using the positive electrode plate as an example.

TABLE 4

| Electrode plate number | Support layer | | Conductive layer | | Electrode active material layer | | $D_{total}$/D1 2D4/D1 |
|---|---|---|---|---|---|---|---|
| | Material | D1 | Material | D2 | Material | D4 | |
| Positive electrode plate 11 | PI | 2 μm | Al | 800 nm | NCM811 | 55 μm | 55 |
| Positive electrode plate 12 | PI | 5 μm | Al | 2 μm | NCM811 | 55 μm | 22 |
| Positive electrode plate 13 | PI | 6 μm | Al | 300 nm | NCM811 | 55 μm | 18.3 |
| Positive electrode plate 14 | PET | 5 μm | Al | 500 nm | NCM811 | 55 μm | 22 |
| Positive electrode plate 15 | PET | 10 μm | Al | 1 μm | NCM811 | 55 μm | 11 |
| Positive electrode plate 16 | PET | 8 μm | Al | 1.5 μm | NCM811 | 55 μm | 13.7 |

(no conductive primer layer was disposed on electrode plates in Table 4)

TABLE 5

| Battery number | Positive electrode plate | Negative electrode plate | Nail penetration test result |
|---|---|---|---|
| Battery 20 | Conventional positive electrode plate | Conventional negative electrode plate | All failed |
| Battery 21 | Positive electrode plate 11 | Conventional negative electrode plate | All passed |
| Battery 22 | Positive electrode plate 12 | Conventional negative electrode plate | All passed |
| Battery 23 | Positive electrode plate 13 | Conventional negative electrode plate | All passed |
| Battery 24 | Positive electrode plate 14 | Conventional negative electrode plate | All passed |
| Battery 25 | Positive electrode plate 15 | Conventional negative electrode plate | All passed |
| Battery 26 | Positive electrode plate 16 | Conventional negative electrode plate | All passed |

Because a lithium-ion battery using the composite current collector has a thinner conductive layer than the conventional metal current collector, metal burr generated in unexpected situations such as nail penetration are relatively small, and a support layer of the composite current collector has relatively great short-circuit resistance, thereby improving nail penetration safety performance of the battery. It may be learned from the foregoing table that, the conventional battery had thermal runaway and destruction in the nail penetration case and could not pass the nail penetration safety test. All lithium-ion batteries using the composite current collector can pass the nail penetration safety test.

4.4 Impact of the Ratio of $D_{total}$/D1 on a Lithium-Ion Battery

The following is tested performance of the battery with different ratios of $D_{total}$/D1 by using the positive electrode plate as an example.

TABLE 6

| Electrode plate number | Support layer | | Conductive layer | | Electrode active material layer | | 2D4/D1 |
|---|---|---|---|---|---|---|---|
| | Material | D1 | Material | D2 | Material | D4 | |
| Positive electrode plate 15 | PET | 10 μm | Al | 1 μm | NCM811 | 55 μm | 11 |
| Positive electrode plate 15-1 | PI | 20 μm | Al | 1 μm | NCM811 | 10 μm | 1 |
| Positive electrode plate 15-2 | PI | 20 μm | Al | 1 μm | NCM811 | 30 μm | 3 |
| Positive electrode plate 15-3 | PI | 2 μm | Al | 1 μm | NCM811 | 50 μm | 50 |
| Positive electrode plate 15-4 | PET | 1 μm | Al | 1 μm | NCM811 | 50 μm | 100 |
| Positive electrode plate 15-5 | PET | 1 μm | Al | 1 μm | NCM811 | 75 μm | 150 |
| Positive electrode plate 15-6 | PET | 1 μm | Al | 1 μm | NCM811 | 100 μm | 200 |

(no conductive primer layer was disposed on electrode plates in Table 6)

TABLE 7

| Battery Serial number | Positive electrode plate | Negative electrode plate | Nail penetration test result | Battery energy density | in the 1000th cycle Capacity retention rate (Method 2) |
|---|---|---|---|---|---|
| Battery 25 | Positive electrode plate 15 | Conventional negative electrode plate | All passed | Greater than 200 wh/Kg | 90% |
| Battery 25-1 | Positive electrode plate 15-1 | Conventional negative electrode plate | All passed | Less than 120 wh/Kg | 97% |
| Battery 25-2 | Positive electrode plate 15-2 | Conventional negative electrode plate | All passed | Less than 120 wh/Kg | 95% |
| Battery 25-3 | Positive electrode plate 15-3 | Conventional negative electrode plate | All passed | Greater than 200 wh/Kg | 91% |
| Battery 25-4 | Positive electrode plate 15-4 | Conventional negative electrode plate | All passed | Greater than 200 wh/Kg | 80% |
| Battery 25-5 | Positive electrode plate 15-5 | Conventional negative electrode plate | All passed | Greater than 200 wh/Kg | /[1] |
| Battery 25-6 | Positive electrode plate 15-6 | Conventional negative electrode plate | All passed | Greater than 200 wh/Kg | /[2] |

Notes:
[1] already less than 80% in the 800th cycle
[2] already less than 80% in the 600th cycle It may be learned from the foregoing test data that: 1) When $200 \geq D_{total}/D1 \geq 1$, nail penetration test results were very good; 2) when $100 \geq D_{total}/D1 \geq 3$, on the basis of good nail penetration performance, battery energy density was relatively high; 3) most specifically, when $50 \geq D_{total}/D1 \geq 10$, the battery showed excellent cycle performance (a relatively high capacity retention rate) in addition to good nail penetration performance and relatively high energy density.

4.5 Effect of a Conductive Primer Layer on Improvement of Electrochemical Properties of a Battery The following uses the positive electrode plate as an example to illustrate effects of the conductive primer layer and composition of the conductive primer layer on improvement of the electrochemical properties of the battery. Table 8 shows specific composition and related parameters of batteries (in Table 8, except the comparative positive electrode plate 20, all other positive electrode plates were provided with a conductive primer layer) in embodiment examples and comparative examples, and the electrode plates and current collectors used therein. Table 9 shows a performance measurement result of each battery.

TABLE 8

| Electrode plate number | Current collector number | Support layer Material | D1 | Conductive layer Material | D2 | Conductive primer layer | Electrode active material layer |
|---|---|---|---|---|---|---|---|
| Comparative positive electrode plate 20 | Positive current collector 4 | PET | 10 μm | Al | 1 μm | / | NCM333, D50 9.8 μm, an active material layer of thickness of 55 μm |
| Positive electrode plate 21 | Positive current collector 4 | PET | 10 μm | Al | 1 μm | Conductive carbon black 10%, aqueous polyacrylic acid 90%, with thickness of 1.5 μm | Same as the above |
| Positive electrode plate 22 | Positive current collector 4 | PET | 10 μm | Al | 1 μm | Conductive carbon black 20%, aqueous polyacrylic acid 80%, with thickness of 1.5 μm | Same as the above |
| Positive electrode plate 23 | Positive current collector 4 | PET | 10 μm | Al | 1 μm | Conductive carbon black 50%, aqueous PVDF 50%, with thickness of 1.5 μm | Same as the above |
| Positive electrode plate 24 | Positive current collector 4 | PET | 10 μm | Al | 1 μm | Conductive carbon black 65%, aqueous PVDF 35%, with thickness of 1.5 μm | Same as the above |
| Positive electrode plate 25 | Positive current collector 4 | PET | 10 μm | Al | 1 μm | Conductive carbon black 80%, aqueous PVDF 20%, with thickness of 1.5 μm | Same as the above |
| Positive electrode plate 26 | Positive current collector 4 | PET | 10 μm | Al | 1 μm | Conductive carbon black 99%, aqueous PVDF 1%, with thickness of 1.5 μm | Same as the above |
| Positive electrode plate 27 | Positive current collector 4 | PET | 10 μm | Al | 1 μm | Conductive carbon black 65%, oily PVDF 35%, with thickness of 1.5 μm | Same as the above |

TABLE 8-continued

| Electrode plate number | Current collector number | Support layer Material | D1 | Conductive layer Material | D2 | Conductive primer layer | Electrode active material layer |
|---|---|---|---|---|---|---|---|
| Positive electrode plate 28 | Positive current collector 4 | PET | 10 μm | Al | 1 μm | Conductive carbon black 80%, oily PVDF 20%, with thickness of 1.5 μm | Same as the above |
| Positive electrode plate 29 | Positive current collector 4 | PET | 10 μm | Al | 1 μm | Conductive carbon black 32.5%, flake conductive graphite (D50 0.05 μm) 32.5%, aqueous PVDF 35%, with thickness of 1.5 μm | Same as the above |
| Positive electrode plate 30 | Positive current collector 4 | PET | 10 μm | Al | 1 μm | Conductive carbon black 65%, aqueous PVDF 35%, with thickness of 500 nm | Same as the above |
| Positive electrode plate 31 | Positive current collector 4 | PET | 10 μm | Al | 1 μm | Conductive carbon black 65%, aqueous PVDF 35%, with thickness of 2 μm | Same as the above |
| Positive electrode plate 32 | Positive current collector 4 | PET | 10 μm | Al | 1 μm | Conductive carbon black 65%, aqueous PVDF 35%, with thickness of 5 μm | Same as the above |

TABLE 9

| Battery number | Electrode plate | | DCR growth rate |
|---|---|---|---|
| Battery 30 | Comparative positive electrode plate 20 | Conventional negative electrode plate | 35% |
| Battery 31 | Positive electrode plate 21 | Conventional negative electrode plate | 30.9% |
| Battery 32 | Positive electrode plate 22 | Conventional negative electrode plate | 29% |
| Battery 33 | Positive electrode plate 23 | Conventional negative electrode plate | 20% |
| Battery 34 | Positive electrode plate 24 | Conventional negative electrode plate | 15% |
| Battery 35 | Positive electrode plate 25 | Conventional negative electrode plate | 14.5% |
| Battery 36 | Positive electrode plate 26 | Conventional negative electrode plate | 14% |
| Battery 37 | Positive electrode plate 27 | Conventional negative electrode plate | 18.5% |
| Battery 38 | Positive electrode plate 28 | Conventional negative electrode plate | 18.2% |
| Battery 39 | Positive electrode plate 29 | Conventional negative electrode plate | 12.9% |
| Battery 40 | Positive electrode plate 30 | Conventional negative electrode plate | 15.5% |
| Battery 41 | Positive electrode plate 31 | Conventional negative electrode plate | 14.6% |
| Battery 42 | Positive electrode plate 32 | Conventional negative electrode plate | 14.1% |

It can be learned from the above test data that:

1. When a composite current collector with a thin conductive layer (that is, the comparative positive electrode plate 20 without a conductive primer layer) was used, the battery had large DCR and a low cycle capacity retention rate due to shortcomings such as having poorer conductivity than a conventional metal current collector, and damage vulnerability of the conductive layer in the composite current collector. However, after the conductive primer layer was introduced, by effectively mending and constructing a conductive network among the current collector, the conductive primer layer, and the active material, the conductive primer layer helped to improve the electron transfer efficiency, and reduce the resistance between the current collector and the electrode active material layer, so that the DCR can be effectively reduced.

2. With increase of the conductive agent content in the conductive primer layer (the positive electrode plates 21 to 26), the DCR of the battery could be greatly reduced.

3. Under the same composition, the aqueous binder could help to reduce the DCR more obviously than the oily binder (a positive electrode plate 24 vs. a positive electrode plate 27 and a positive electrode plate 25 vs. a positive electrode plate 28).

4. The flake graphite could generate "horizontal sliding", thereby achieving a function of buffering, reducing the damage to the conductive layer of the current collector during the compacting process, and reducing cracks. Therefore, the flake graphite could further reduce the DCR of the battery (a positive electrode plate 24 vs. a positive electrode plate 29).

5. With the increase of the thickness of the conductive primer layer (a positive electrode plate 30 vs. a positive electrode plate 32), the DCR of the battery could be reduced more significantly. However, too large thickness of the conductive primer layer was not conducive to the improvement of the energy density of the battery.

4.6 Effect of the Binder Content in an Electrode Active Material Layer on Improvement of Electrochemical Properties of a Battery When the binder content in the electrode active material layer was high, the bonding force between the active material layer and the current collector was strong, and when there was the conductive primer layer, the bonding force between the entire film layer (that is, a collective term for the active material layer and the conductive primer layer) and the composite current collector was also strong. Therefore, in unexpected situations such as nail penetration, the active material layer (or the film layer) could efficiently wrap the metal burrs generated in the conductive layer to improve the nail penetration safety performance of the battery.

The following uses the positive electrode plate as an example to illustrate the effects of the binder content in the electrode active material layer on improvement of the electrochemical properties of the battery from the perspective of the safety of battery nail penetration.

The positive electrode plates were prepared according to the method described in the preceding embodiment examples, but the composition of the positive active material layer slurry was adjusted to prepare a plurality of positive electrode plates with different binder contents in the positive active material layer. The specific electrode plate composition is shown in the table below.

TABLE 10

| Electrode plate number | Current collector number | Support layer Material | D1 | Conductive layer Material | D2 | Conductive primer layer | Electrode active material layer |
|---|---|---|---|---|---|---|---|
| Positive electrode plate 33 | Positive current collector 4 | PET | 10 μm | Al | 1 μm | Conductive carbon black 65%, aqueous PVDF 35%, with thickness of 1.5 μm | NCM811, D50 6.5 μm, active material layer with thickness of 55 μm, 0.5 wt % of PVDF in binder |
| Positive electrode plate 34 | Positive current collector 4 | PET | 10 μm | Al | 1 μm | Conductive carbon black 65%, aqueous PVDF 35%, with thickness of 1.5 μm | NCM811, D50 6.5 μm, active material layer with thickness of 55 μm, 1 wt % of PVDF in binder |
| Positive electrode plate 35 | Positive current collector 4 | PET | 10 μm | Al | 1 μm | Conductive carbon black 65%, aqueous PVDF 35%, with thickness of 1.5 μm | NCM811, D50 6.5 μm, active material layer with thickness of 55 μm, 2 wt % of PVDF in binder |
| Positive electrode plate 36 | Positive current collector 4 | PET | 10 μm | Al | 1 μm | Conductive carbon black 65%, aqueous PVDF 35%, with thickness of 1.5 μm | NCM811, D50 6.5 μm, active material layer with thickness of 55 μm, 3 wt % of PVDF in binder |

Table 11 shows a nail penetration test result of the batteries assembled by using the foregoing different positive electrode plates. The results show that the amount the binder content in the positive active material layer generated better nail penetration safety performance of the corresponding battery. The binder content in the positive active material layer was not less than 1 wt %, more specifically not less than 1.5 wt %, or most specifically, not less than 2 wt %.

TABLE 11

| Battery number | Electrode plate | | Nail penetration test result |
|---|---|---|---|
| Battery 43 | Positive electrode plate 33 | Conventional negative electrode plate | 1 passed, 9 failed |
| Battery 44 | Positive electrode plate 34 | Conventional negative electrode plate | 6 passed, 4 failed |
| Battery 45 | Positive electrode plate 35 | Conventional negative electrode plate | All passed |
| Battery 46 | Positive electrode plate 36 | Conventional negative electrode plate | All passed |

Based on the foregoing embodiment examples, it can be determined that when the composite current collector including the support layer and the conductive layer disposed on at least one surface of the support layer is used, to implement good safety performance and electrochemical performance of the battery, the total thickness $D_{total}$ of the electrode active material layer and the thickness D1 of the support layer should satisfy $200 \geq D_{total}/D1 \geq 1$ (specifically $100 \geq D_{total}/D1 \geq 3$, and more specifically, $50 \geq D_{total}/D1 \geq 10$), and based on the total weight of the electrode active material layer, the binder content in the electrode active material layer is not less than 1 wt %, more specifically not less than 1.5 wt %, or most specifically, not less than 2 wt %.

A person skilled in the art may understand that the foregoing shows an application example of an electrode plate only by using a lithium-ion battery as an example; however, the electrode plate in this application may also be applied to another type of electrochemical apparatus or an apparatus including the electrochemical apparatus, and a good technical effect of this application can still be achieved.

According to the disclosure and teaching of this specification, a person skilled in the art of this application may further make appropriate changes or modifications to the foregoing implementations. Therefore, this application is not limited to the foregoing disclosure and the described specific implementations, and some changes or modifications to this application shall also fall within the protection scope of the claims of this application. In addition, although some specific terms are used in this application, these terms are used only for ease of description, and do not constitute any limitation on this application.

What is claimed is:

1. An electrode plate, comprising a current collector and an electrode active material layer disposed on at least one surface of the current collector, wherein
   the current collector comprises a support layer and a conductive layer disposed on at least one surface of the support layer, and single-side thickness D2 of the conductive layer along a thickness direction of the current collector satisfies: 30 nm≤D2≤3 μm; and the support layer comprises a polymer material or polymer composite material, and a thickness D1 of the support layer along a thickness direction of the current collector satisfies: 1 μm≤D1≤20 μm;
   the electrode active material layer comprises an electrode active material, a binder, and a conductive agent, and a total thickness $D_{total}$ of the electrode active material layer satisfies: $200 \geq D_{total}/D1 \geq 1$;
   based on total weight of the electrode active material layer, a binder content of the binder in the electrode active material layer is not less than 1 wt %; and
   the electrode plate has a length direction, which is a main dimension direction with a larger magnitude, and a width direction, which is a secondary dimension direction with a smaller magnitude, the length direction and the width direction are perpendicular to the thickness direction of the current collector,
   when viewed in the width direction of a coated surface of the electrode plate, the electrode active material layer comprises 2n+1 areas based on compacted density, and a compacted density of a middle area is greater than a compacted density of the areas on both sides relative to the middle area.

2. The electrode plate according to claim 1, wherein the total thickness $D_{total}$ of the electrode active material layer satisfies $100 \geq D_{total}/D1 \geq 3$.

3. The electrode plate according to claim 1, wherein the total thickness $D_{total}$ of the electrode active material layer satisfies $50 \geq D_{total}/D1 \geq 10$.

4. The electrode plate according to claim 1, wherein the binder content in the electrode active material layer is not less than 1.5 wt %.

5. The electrode plate according to claim 1, wherein the binder content in the electrode active material layer is not less than 2 wt %.

6. The electrode plate according to claim 1, wherein a conductive primer layer comprising a conductive material and a binder is further disposed between the current collector and the electrode active material layer.

7. The electrode plate according to claim 6, wherein the conductive primer layer further comprises an electrode active material; and single-side thickness H of the conductive primer layer is 0.1 μm to 5 μm.

8. The electrode plate according to claim 6, wherein a ratio of H to D2 is 0.5:1 to 5:1.

9. The electrode plate according to claim 1, wherein the conductive layer is a metal conductive layer, and a material of the metal conductive layer is selected from at least one of aluminum, copper, nickel, titanium, silver, nickel-copper alloy, and aluminum-zirconium alloy.

10. The electrode plate according to claim 1, wherein a material of the support layer is selected from at least one of an insulating polymer material, an insulating polymer composite material, a conductive polymer material, and a conductive polymer composite material.

11. The electrode plate according to claim 1, wherein thickness D1 of the support layer satisfies: $1 \mu m \leq D1 < 15 \mu m$; or a room-temperature Young's modulus of the support layer satisfies: $20 \text{ GPa} \geq E \geq 4 \text{ GPa}$; or there are cracks in the conductive layer; or the single-side thickness D2 of the conductive layer satisfies: $300 \text{ nm} \leq D2 \leq 2 \mu m$.

12. The electrode plate according to claim 1, wherein a protective layer is further disposed on the conductive layer, the protective layer is disposed only on one surface of the conductive layer of the current collector or disposed on two surfaces of the conductive layer of the current collector; and thickness D3 of the protective layer satisfies: $D3 \leq \frac{1}{10} D2$ and $1 \text{ nm} \leq D3 \leq 200 \text{ nm}$.

13. The electrode plate according to claim 12, wherein $10 \text{ nm} \leq D3 \leq 50 \text{ nm}$.

14. The electrode plate according to claim 6, wherein based on total weight of the conductive primer layer, a percentage of the conductive material by weight is 10% to 99%.

15. The electrode plate according to claim 1, wherein an average particle size D50 of the electrode active material is 5 μm to 15 μm.

16. An electrochemical apparatus, comprising a positive electrode plate, a negative electrode plate, a separator, and an electrolyte, wherein the positive electrode plate and/or the negative electrode plate are/is the electrode plate according to claim 1.

17. An apparatus, comprising the electrochemical apparatus according to claim 16.

18. The electrode plate according to claim 1, wherein the compacted density of the middle area is greater than the compacted density of areas on both sides by 5% to 30% of the compacted density of the middle area.

19. The electrode plate according to claim 1, wherein a ratio of a width of the middle area to a sum of a width of each one of the areas is 30% to 70%.

20. The electrode plate according to claim 1, wherein the compacted density of the middle area is the highest among all of the 2n+1 areas, and the compacted density of the areas on both sides gradually decreases from middle to edge along the width direction of the electrode plate.

* * * * *